's Patent

United States Patent [19]
Meyers et al.

[11] 4,068,478
[45] Jan. 17, 1978

[54] CONTAINMENT BARRIER SECTION ARRANGEMENT

[75] Inventors: Frank Meyers; Henry J. Folson; Gwenn B. Meyers, all of Los Angeles, Calif.

[73] Assignee: Frank Meyers, Torrance, Calif.

[21] Appl. No.: 628,231

[22] Filed: Nov. 3, 1975

[51] Int. Cl.² .............................................. E02B 15/04
[52] U.S. Cl. ...................................... 61/1 F; 138/154
[58] Field of Search ............ 61/1 E, 5; 210/DIG. 21; 138/154

[56] References Cited

U.S. PATENT DOCUMENTS

| | | | |
|---|---|---|---|
| 3,576,108 | 4/1971 | Rowland | 61/1 F |
| 3,686,869 | 8/1972 | Manuel | 61/1 F |
| 3,798,911 | 3/1974 | Oberg | 61/1 F |
| 3,803,848 | 4/1974 | Van't Hof | 61/1 F |
| 3,811,285 | 5/1974 | Ballu | 61/1 F |

*Primary Examiner*—Jacob Shapiro
*Attorney, Agent, or Firm*—Don B. Finkelstein

[57] ABSTRACT

An improved containment barrier or boom section of the type having a flotation means for supporting the barrier or boom on the surface of a liquid body such as a lake, harbor, river, ocean, or the like, and also having a sinking means such as a flexible skirt section coupled to the bottom of the flotation means and extending below the surface, the skirt section containing ballast and, preferably, a tension member, to contain contamination or material floating on or near the surface, such as an oil spill, usually on one side thereof. End connectors are provided at each end of the barrier section for coupling to additional barrier or boom sections and/or to a towing means for deployment and/or recovery. The flotation means comprises an elongated tubular member having a cavity extending throughout the elongated length thereof and the tubular member is flexible. A transversely rigid and longitudinally compressible-expandable means is positioned in the cavity of the tubular member throughout the length thereof and holds the tubular member in a predetermined cross-sectional configuration, such as circular or any other desired shape. Vent means are provided to allow passage of air from regions external the flotation means into the cavity of the tubular member. The barrier or boom may be compressed in the longitudinal direction due to the flexibility of the tubular member and the transversely rigid and longitudinally compressible-expandable means to a storage or handling condition having a longitudinal length a fraction of the length in the elongated or deployed condition. The tubular member is substantially maintained in the predetermined cross-sectional configuration in both the stored and deployed condition. Additional flotation means may be provided in the tubular member to insure any desired degree of buoyancy for the boom. In the stored condition the tubular member folds in a manner similar to accordion-type folding.

78 Claims, 33 Drawing Figures

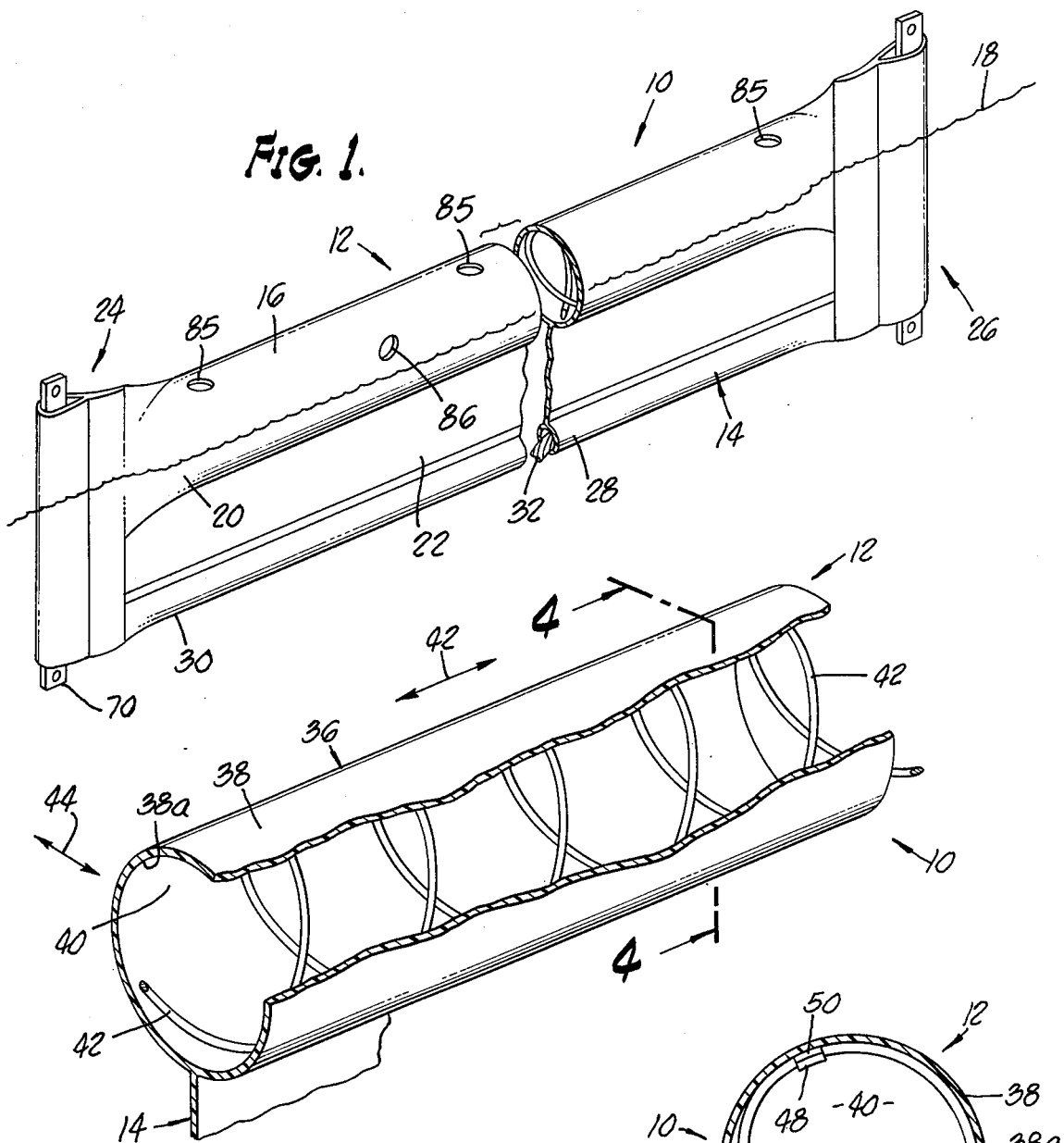

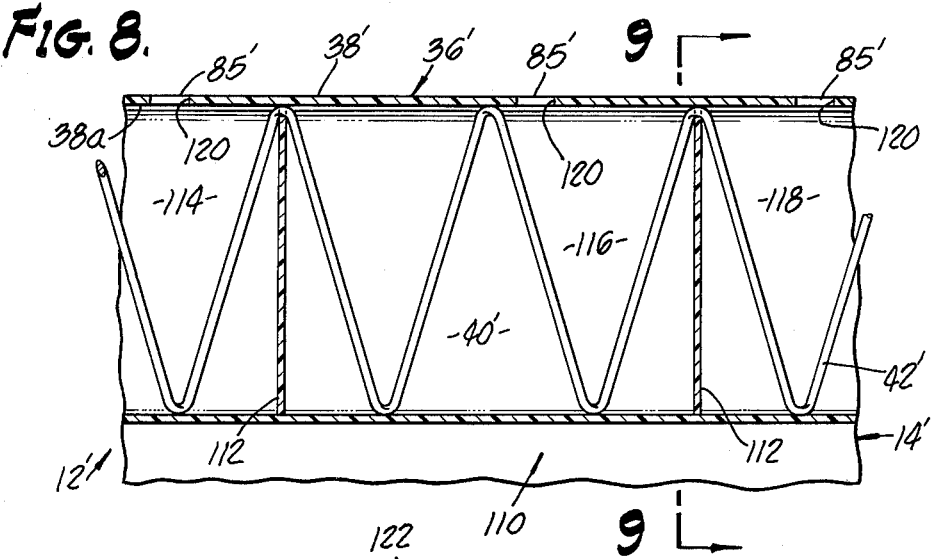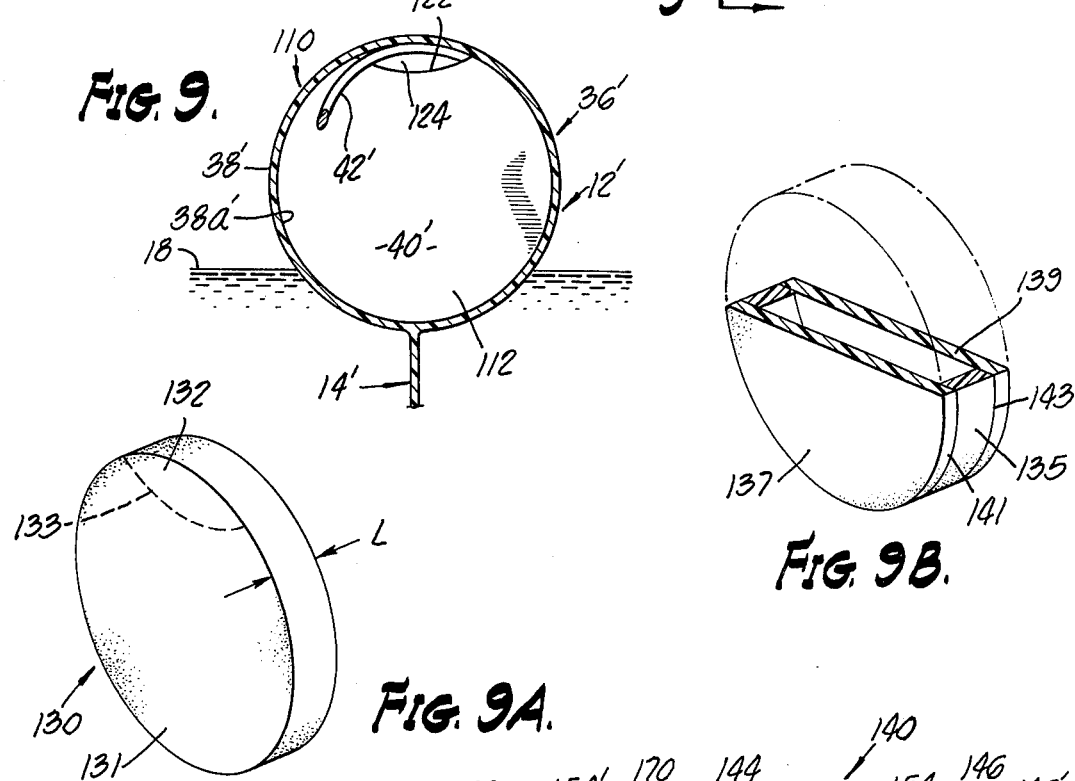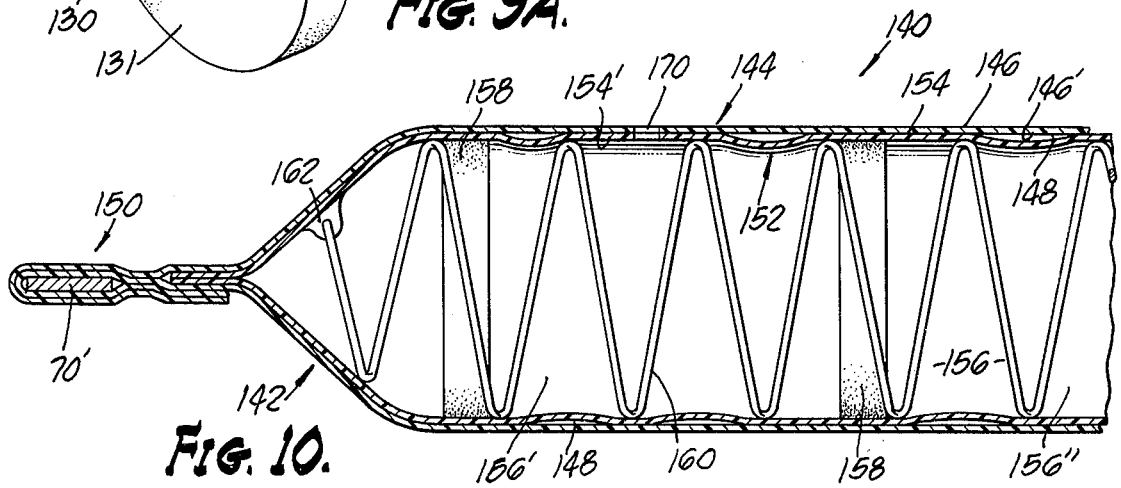

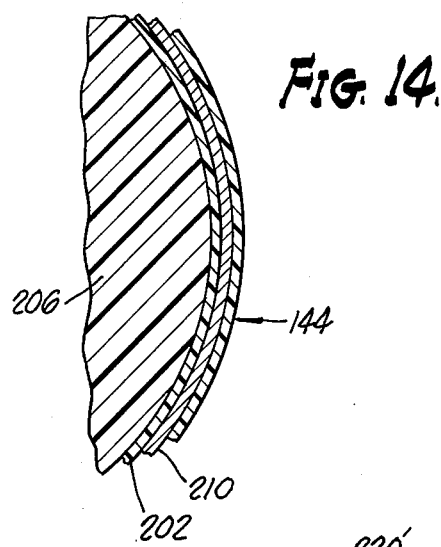
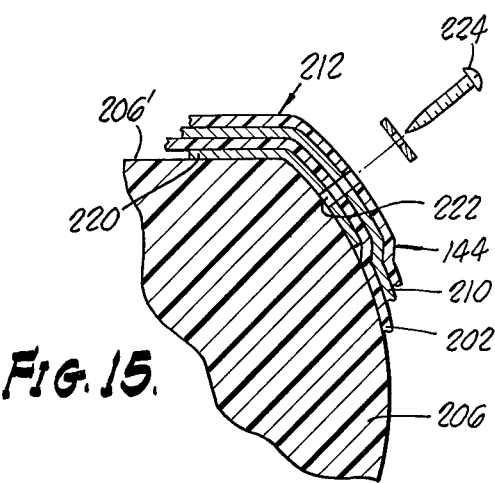
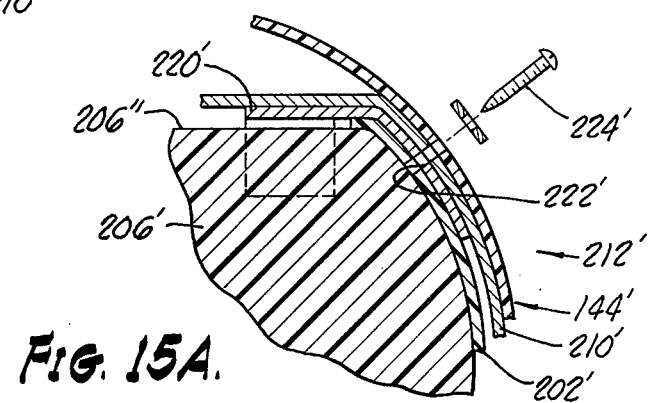
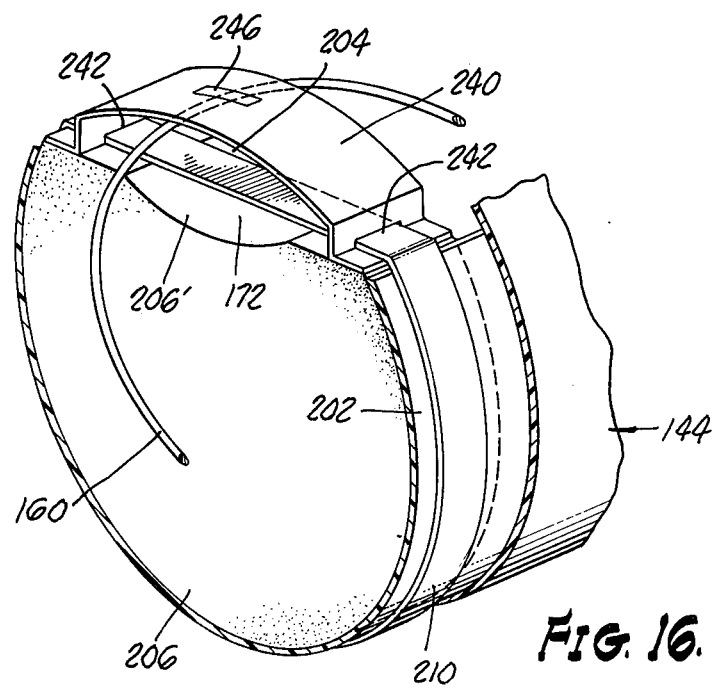

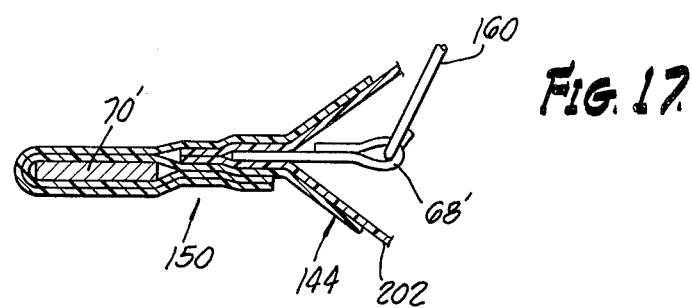
FIG. 17.
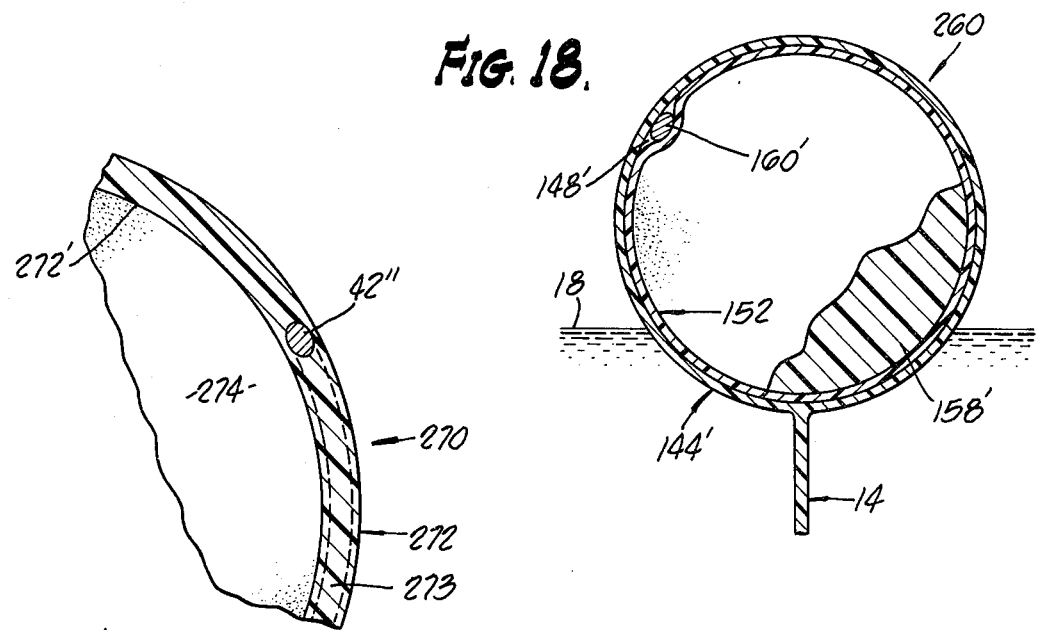
FIG. 18.
FIG. 19.
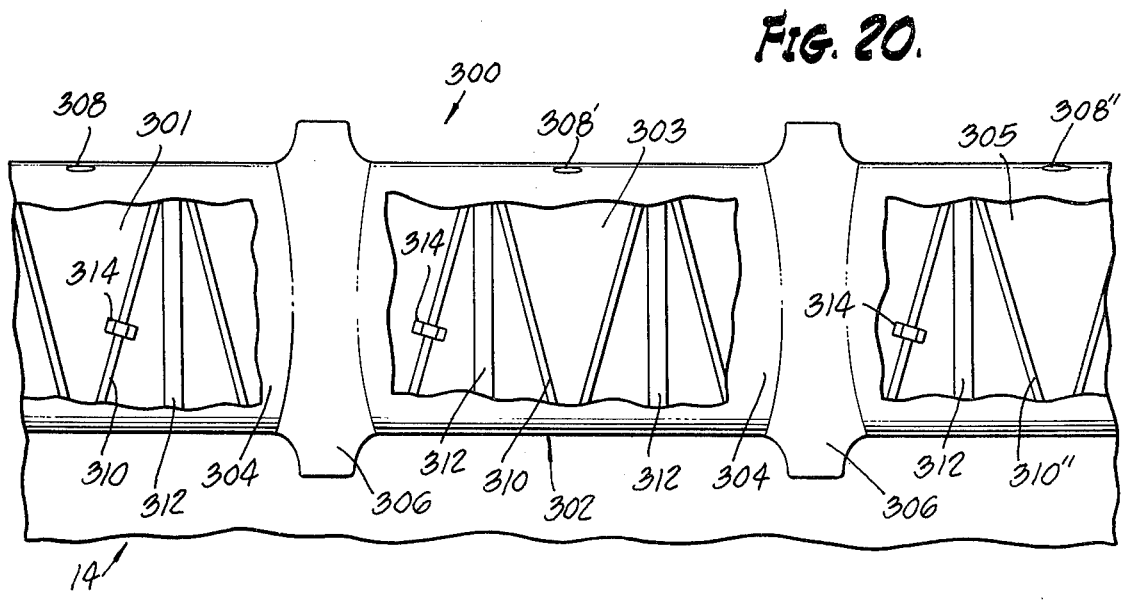
FIG. 20.

CONTAINMENT BARRIER SECTION ARRANGEMENT

BACKGROUND OF THE INVENTION

1. Field of the Invention

This invention relates to the flotation barrier or boom art and more particularly to an improved containment barrier or boom.

2. Description of the Prior Art

The increased frequency of contamination of bodies of water such as rivers, harbors, ponds, lakes, oceans, and the like, by, for example, oil spills, has increased the need for effective containment barriers or booms wherein the area of the liquid body having the contamination may be separated from adjacent areas of the liquid body and the contamination contained within the sectioned off area. The contamination may be removed without further contamination of additional areas. Various types of booms have heretofore been utilized for providing the barrier separating the contaminated area from uncontaminated areas. One type of boom that has been widely utilized is a flotation boom, generally fabricated in sections. Each section of the boom may be coupled to adjacent sections to form an entire boom of any desired length deployed in any desired geometrical configuration to contain the contamination area. Such flotation booms have generally incorporated a flotation means floating on the surface of the liquid and a dependent sinking means or skirt extending from the bottom of the flotation means into the liquid. The skirt has a predetermined depth and generally incorporated a ballast and, preferably, a tension member.

The flotation means heretofore utilized has comprised, for example, logs, sealed rigid containers such as oil drums or the like, inflatable tubular members, tubular members filled with a buoyant material, i.e., a material having a specific gravity less than 1.0, or similar devices. However, such prior art flotation means in a containment boom have generally not proven to be completely satisfactory. Since the containment boom is often stored for comparatively long periods of time and only deployed on the liquid when it is necessary to contain a contaminated area, the storage volume is preferably as small as possible. Further, since the contamination may occur quite suddenly, the boom should be able to be rapidly deployed with comparatively low drag and low turbulence inducement in the liquid. Further, it should be deployable without utilizing sophisticated machinery and/or highly skilled labor. Additionally, it is also desired that the boom be capable of articulation in both the horizontal and vertical directions, while maintaining its cross-sectional configuration, in response to the forces imposed to minimize stresses imposed on the boom as well as maintaining desired draft and freeboard and minimizing splash-over. Further, each boom section is preferably fabricated in as longitudinally long sections as possible to reduce the turbulence of mixing effect on deployment or when used, and to reduce costs associated with boom section connections.

One form of inflatable boom heretofore utilized has incorporated a plurality of boom elements, each approximately 25 yards long and has a flotation portion and a dependent skirt portion. The flotation section is a flexible fabric and has a generally rectangular configuration in the deployed condition and is transversely collapsible in the stored condition to a flat configuration in which it may, for example, be coiled. Each element is comprised of a plurality of sections on the order of 1 to 2 yards long. Each section has one or more individual spring loaded, pivotally connected rectangular frames and a check valve for admitting air into the section. In the collapsed, or storage condition, the springs allow the collapse of the rectangular frames to permit the boom to assume the transversely flat storage configuration. Means are provided, in the storage configuration, to resist the spring forces and prevent opening of the boom. On deployment, the restraints are removed and the springs force the rectangular frames into the rectangular configuration opening the tubular member to conform to the rectangular cross-section. Air is drawn into each compartment during the opening of the tubular member through the check valve and the trapped air in the boom, which exceeds atmospheric pressure, provides buoyancy. The trapped air in the boom resists the natural liquid forces acting thereon which tend to transversely collapse the boom and, thus, the combination of the trapped air and the spring loaded frames may be required to maintain buoyancy. On retrieval of the boom section, air must be vented by manual operation of some form of valve and each rectangular frame must be collapsed and means provided to retain the collapsed configuration. Such operating mechanical structures in the interior of the boom, the automatic opening as well as the labor associated with retrieval, have made such boom elements unsatisfactory in many applications.

The logs and the buoyant material filled flotation means have generally required the same volume in a stored condition as in the deployed condition. While some inflatable flotation booms may be stored in a volume less than the deployed volume, they have usually required utilization of an air compressor or similar device to provide a positive pressure on the interior thereof to achieve the desired flotation and buoyancy characteristics.

Many of the prior art booms have been fabricated so that the cross-sectional configuration is not constant for substantial longitudinal lengths, thereby increasing the turbulence inducing effect and increasing the drag. Also, the more rigid of such booms could not provide the desired degree of vertical and/or horizontal articulation within each boom section, resulting in higher stresses imposed because of the forces occurring in use and less containment capability.

Therefore, there has long been a need for a containment boom which not only may be stored in a comparatively small volume comprising a fraction of its fully deployed volume but also may be rapidly and easily deployed from the stored condition to the deployed condition without utilization of highly skilled labor and/or complicated or sophisticated machinery. Also, such booms should be capable of vertical and horizontal articulation is use while maintaining the same cross-sectional configuration and have low drag and turbulence inducing characteristics as well as being fabricated in comparatively longitudinally long sections.

SUMMARY OF THE INVENTION

Accordingly, it is an object of the present invention to provide an improved containment boom section.

It is another object of the present invention to provide an improved containment boom section that may be rapidly and easily deployed and retrieved.

It is another object of the present invention to provide an improved containment boom section in which the volume occupied by the boom in the storage condition is a small fraction of the volume occupied by the containment boom in the fully deployed condition.

It is yet another object of the present invention to provide an improved containment boom section that is fully compatible with the desired operational requirements for containment booms, is of rugged construction and can provide a comparatively long operational service life.

The above and other objects of the present invention are achieved, according to a preferred embodiment, by providing a flotation means with a predetermined buoyancy. Predetermined buoyancy is selected to provide upper portions of the flotation means above the surface level of the liquid body, such as a lake, river, pond, stream, harbor, or ocean, and a lower portion of the flotation means is below the surface level. The buoyancy of the flotation means may be selected to provide any degree of buoyancy desired.

A flexible skirt section is dependent from the lower portion of the flotation means and extends a predetermined distance below the surface level of the liquid body. The flexible skirt section means may incorporate a ballast member and/or a tension member.

End portions of the containment boom section may be provided with attachment means for attaching the boom section to adjacent boom sections at each end thereof, or other structures, to a deployment means such as a tow assembly, winch or cable, or the like, utilized for deploying the boom.

According to the principles of the present invention, the improvement in the containment boom defined herein relates to improvements in the flotation means. Consequently, the flexible skirt section and/or end connections do not, per se, form a part of the invention herein.

The flotation means, according to the principles of the present invention, is comprised of a generally elongated, flexible, generally tubular member having walls defining an internal cavity. The flotation means has a first end and a second end and is longitudinally compressible-expandable between a compressed, storage condition and an elongated, deployed condition.

A transversely rigid and longitudinally compressible-expandable means is positioned in the cavity of the tubular member and extends substantially from the first end to the second end and bears against the internal surfaces of the walls of the tubular member. The transversely rigid characteristic of this member maintains substantially, a predetermined transverse cross-sectional configuration of the tubular member such as, for example, circular, in both the compressed and elongated conditions.

The transversely rigid and longitudinally compressible-expandable means may comprise, for example, a wire means extending from the first end to the second end of the tubular member in a generally helical configuration. Thus, the transversely rigid and longitudinally compressible-expandable means in this embodiment has a shape similar to a coil spring.

Connection means are coupled to the tubular member and connect the transversely rigid and longitudinally compressible-expandable means to the tubular member. Such connection may be made at the ends of the tubular member, at a plurality of points intermediate the ends of the tubular member, or both.

Vent means, such as an aperture in the wall of the tubular member, are provided in regions adjacent the upper portion of the flotation means to allow air to flow between the cavity and regions external the flotation means.

In the stored condition the transversely rigid and longitudinally compressible-expandable means is compressed and the elongated tubular member is also compressed. Thus, in the storage condition, for example, the total volume occupied by the containment boom section may be on the order of 10% – 15% or so of the volume occupied by the containment boom in the elongated, deployed condition. The transversely rigid and longitudinally compressible-expandable means insures that in either condition the tubular member is substantially maintained in the predetermined cross-sectional configuration and thus it is immediately ready for deployment by merely pulling on one end thereof to extend the containment boom section from the stored condition to the elongated deployed condition. Thus, rapid deployment of the boom without utilization of complicated or sophisticated machinery necessary to achieve the desired flotation characteristics and without the utilization of highly skilled labor is achieved.

In another embodiment of the present invention the transversely rigid and longitudinally compressible-expandable means comprises a plurality of ring-like members in a spaced array between the first end and second end of the tubular member. Each of the plurality o ring-like members may be coupled to the inner surface of the tubular member by suitable connection means.

In some embodiments of the present invention it has been found advantageous to compartmentalize the tubular member by providing a plurality of barrier means extending transversely across the cavity of the tubular member. One form of barrier means may comprise a flexible, thin, diaphragm-like member and may, for example, be sealed to the inner surface of the tubular member in a substantially watertight sealing relationship to divide the cavity of the tubular member in a plurality of compartments. The vent means, for such an embodiment, provides venting of each compartment and thus a vent aperture may be provided in the upper portions of the flotation means at each compartment.

The vent means, of course, allows the expulsion of air to allow compressing of the containment boom when it is moved from the elongated, deployed condition into the stored condition, and, conversely allows air to enter the cavity of the tubular member when the containment boom is moved from the stored condition to the elongated, deployed condition.

The barrier means may be provided with an aperture therethrough, preferably in regions adjacent the upper portion of the flotation means to allow air flow between adjacent compartments. For such an embodiment, according to the principles of the present invention, only one or just a few vent means may be required since all compartments of the cavity are in communication with each other through the aperture and thus may be vented through the vent means.

When it is desired to achieve a predetermined flotation buoyancy for the containment boom, for the condition where liquid has entered the cavity of the tubular member, in certain embodiments of the present invention, applicant has found it advantageous to provide, as the barrier means, or alternatively bonded to the thin, diaphragm-like members, a plurality of flotation discs having a predetermined longitudinal thickness and each of the discs having a specific gravity of less than 1.0. The flotation discs are, preferably, comparatively rigid and generally conform to the predetermined cross-sectional configuration of the tubular member and may be bonded or otherwise secured to the inner surface of the tubular member in a special array between the first end and the second end. The predetermined longitudinal thickness, the number of flotation discs and the spacing are selected to provide the desired degree of buoyancy. Such desired degree of buoyancy may provide, for example, for neutral buoyancy when one or more of the compartments of the tubular member have been ruptured and liquid is present therein. Alternatively, the preselected buoyancy may be such that approximately one half or virtually any other desired portion of the volume of the flotation means is in the upper portion, i.e., above the surface level of the liquid, for the above described condition of the compartment of the cavity.

The flotation discs may be completely in watertight sealing relationship to the inner surface of the tubular member to provide a plurality of substantially watertight compartments, in which case separate vent means are needed for each compartment. Alternatively, apertures may be provided, preferably in the upper portion of the flotation means in each of the flotation discs to provide communication for allowing air flow between adjacent compartments. In such an embodiment, of course, as noted above, only one or a comparatively few vent means may be required.

In another embodiment of the present invention, the tubular member is provided with a liner means in the cavity and the liner means is substantially coextensive with the cavity and is adjacent to the walls of the tubular member. The liner means may be coupled to the walls of the tubular member at preselected locations throughout the length thereof, at the ends of the tubular member, or any combination thereof. The liner means is a thin, flexible walled tubular member and the transversely rigid longitudinally compressible-expandable means may be positioned in the liner cavity. Barrier means, such as those described above, may also be provided in the liner cavity. Such an embodiment has certain advantages in the manufacture and asembly of the containment boom according to the principles of the present invention. The liner means also serves, in some embodiments of the present invention as a second watertight container to provide waterproof redundancy.

In yet another embodiment of the present invention, where a liner means as described above is utilized, the transversely rigid longitudinally compressible-expandable means may be provided between the wall of the tubular member and the wall of the liner means.

In other embodiments of the present invention, the transversely rigid and longitudinally compressible-expandable may be fully understood from the following detailed description taken together with the accompanying drawings wherein similar reference characters refer to similar elements throughout. It is to be understood that the accompanying drawings are illustrative of the principles of the present invention and set forth the best mode known for accomplishing the invention. Consequently, the appended drawings are not intended to be limiting to the scope of the invention.

FIG. 1 is a perspective view illustrating one embodiment of the present invention;

FIG. 2 is a perspective view, partially in section, illustrating certain aspects of the present invention;

FIGS. 3 and 4 are sectional views of the embodiment shown in FIG. 2;

FIGS. 8, 9, 9A and 9B illustrate other embodiments of the present invention;

FIG. 10 is a sectional view of another embodiment of the invention;

FIGS. 14, 15 & 15A illustrate other aspects of the embodiment shown in FIG. 13;

FIG. 16 illustrates another embodiment of the present invention;

FIG. 17 illustrates another aspect of the embodiment of the invention shown in FIG. 11;

FIGS. 18 and 19 are sectional views illustrating other embodiments of the present invention;

FIG. 20 illustrates another embodiment of the present invention;

Figure 25:
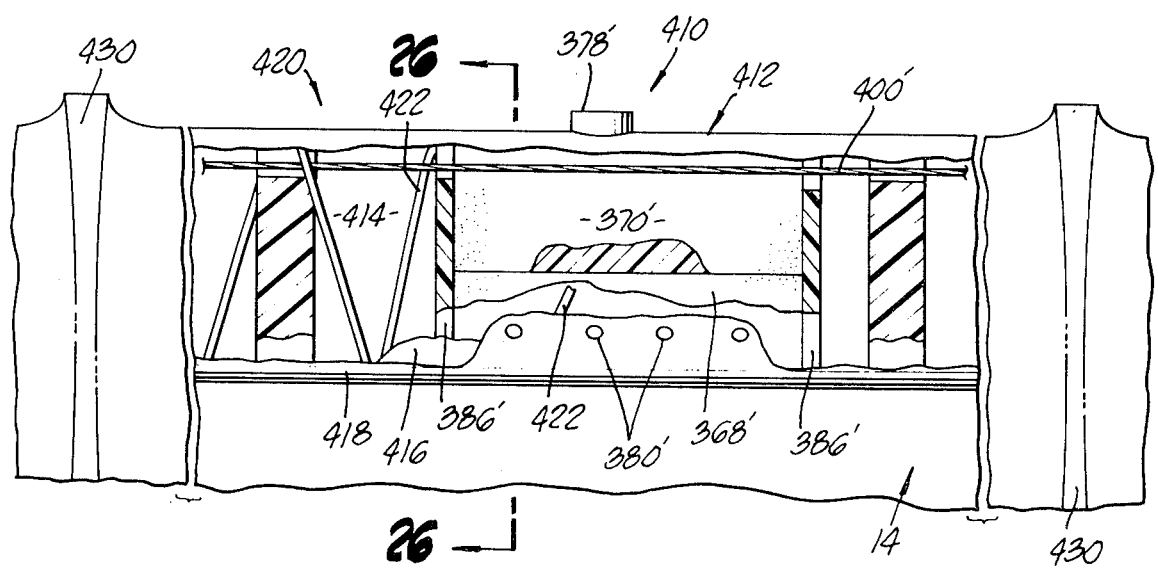
Figure 26:
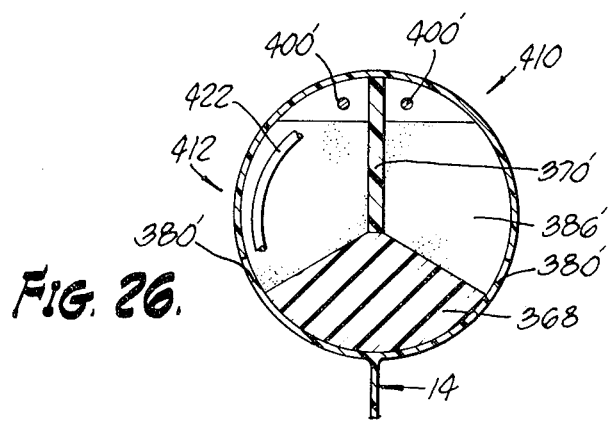
Figure 27:
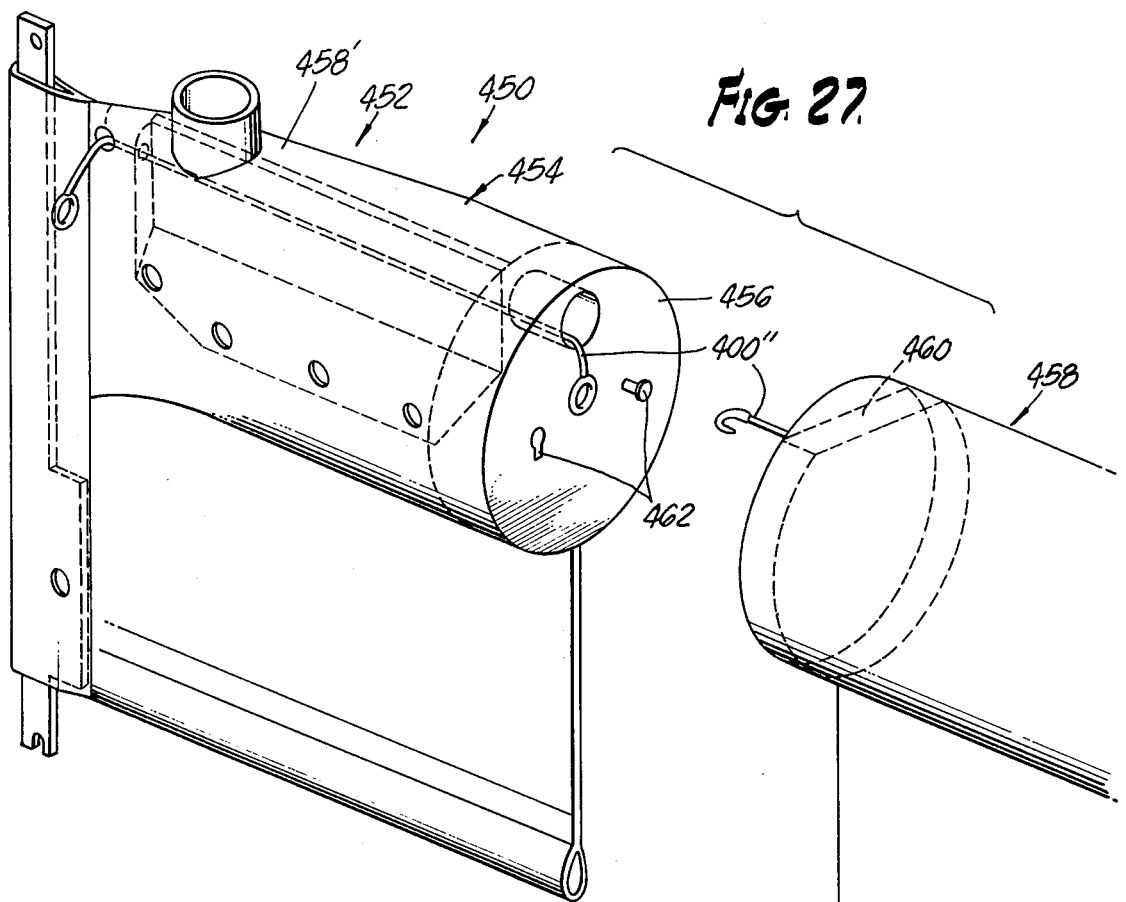

FIGS. 21, 22, 23, and 24 illustrate another embodiment of the present invention;

FIGS. 25 and 26 illustrate another embodiment of the present invention;

FIG. 27 illustrates another embodiment of the present invention; and

Figure 29:
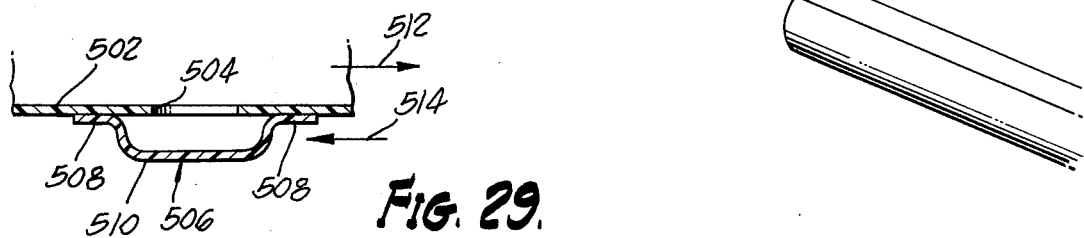
Figure 28:
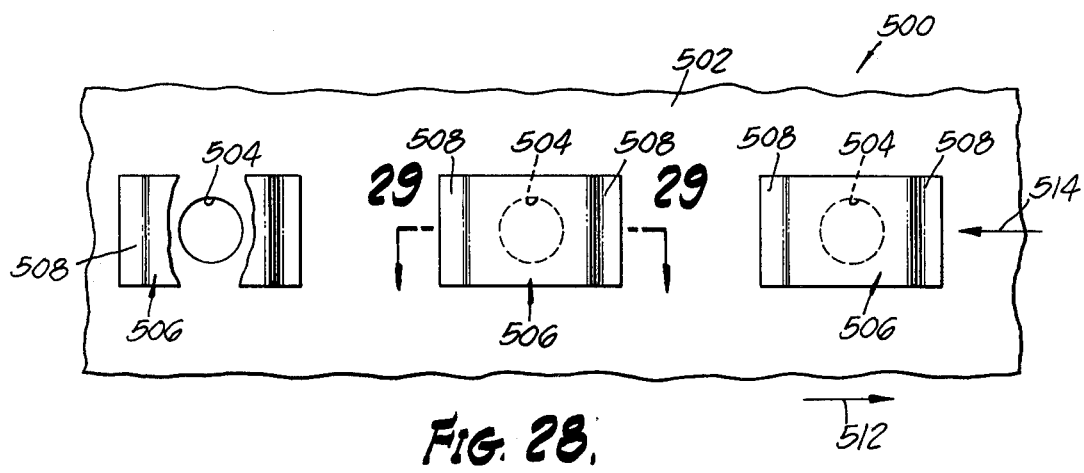

FIGS. 28 and 29 illustrate another embodiment of the present invention.

DESCRIPTION OF THE PREFERRED EMBODIMENTS

Referring now to the drawings there is illustrated in FIG. 1 preferred embodiment, generally designated 10 of a containment barrier or boom section according to the principles of the present invention. The containment boom section 10 is comprised of a flotation means 12 and a flexible skirt section means 14. The containment boom section 10 illustrated in FIG. 1 is shown in an elongated, deployed condition and has a predetermined buoyancy such that there are upper portions 16 of the flotation means 12 above the surface level 18 of the body of liquid in which the boom section 10 is deployed. A lower portion 20 of the flotation means 12 is below the surface level 18.

The flexible skirt section 14 is dependent from the lower portion 20 of the flotation means 12 and extends a predetermined distance below the surface 18. In general, the flexible skirt section means 14 is comprised of an extended flexible member 22 extending substantially the length of the containment from a first end 24 to a second end 26 thereof and is provided with a pocket-like portion 28 at the lower section 30. In the pocket-like section 28 there may be provided a ballast means 32 which may take the form of a chain, cable or similar device serving both as a ballast member and a tension member.

The present invention is concerned with improvement to the flotation section 12 and, consequently, any desired type of flexible skirt section means 14, in addition to the precise form illustrated in FIG. 1, may be incorporated in accordance with the principles of the present invention. Alternatively, of course, if desired, the entire skirt section 14 may be omitted in certain applications.

The flotation means 12, as illustrated in FIG. 2, generally comprises an elongated, flexible, generally tubular member 36 having walls 38 defining a cavity 40 therein which extends substantially from the first end 24 to the second end 26 of the containment boom. A transversely rigid and longitudinally compressible-expandable means 42 is provided in the cavity 40 and extends substantially from the first end 24 to the second end 26 of the containment boom 10 and bears against internal surfaces 38a of the wall 38 of the tubular member 36. The transversely rigid and longitudinally compressible-expandable means 42 substantially maintains the tubular member 12 in a predetermined transverse cross-sectional configuration both in a compressed and an elongated condition thereof, as described below in greater detail. For the embodiment illustrated in FIG. 2 the predetermined transverse cross-sectional configuration of the tubular member 12 is circular. However, it will be appreciated that any desired transverse cross-sectional configuration such as, for example, oval, triangular, rectangular, rhomboid, or any other desired geometrical configuration may be provided.

The tubular member 36, as noted above, is flexible, such that it may be compressed and fold, approximately, in accordion-like style into a compressed condition. The transversely rigid and longitudinally compressible-expandable means 42 substantially maintains the predetermined transverse cross-sectional configuration of the tubular member 36 whether in the elongated, deployed condition as shown in FIG. 2 or when the containment boom section 10 is compressed as described above except for the accordion-like folds described above. In the embodiment shown in FIG. 2 the transversely rigid longitudinally compressible-expandable means is in the form of a wire means fabricated from, for example, metal, plastic, or the like, or of any suitable material having the characteristics described herein, extending from the first end 24 to the second end 26 of the containment boom section 10 and is generally in the form of a helix. Thus, the transversely rigid and longitudinally compressible-expandable means 42, in this embodiment, is similar in configuration to a coil spring and provides transverse rigidity in the direction indicated by the arrow 44 and yet allows compression and expansion in the longitudinal direction indicated by the arrow 46.

Connection means, generally designated 48, as illustrated in FIGS. 3 and 4, may be incorporated in the tubular member 36 for connecting the transversely rigid and longitudinally compressible-expandable means to the tubular member 36. In the embodiment shown in FIGS. 3 and 4 the connecting means 48 takes the form of a strap-like member 50 bonded or otherwise secured to the internal surface 38a of the wall 38 of the tubular member 36 and the transversely rigid and longitudinally compressible-expandable means extends between the strap-like members 50 and the wall 38 for securement thereagainst.

It will be appreciated, of course, that while the transversely rigid and longitudinally compressible-expandable means 42 may be in the shape of a spring, longitudinal resiliency in the direction of the arrow 46 is not required for the practice of the present invention. That is, as long as a transverse rigidity is maintained by the means 42 and it may be extended and compressed, successful operation of a structure built in accordance with the principles of the present invention may be achieved without any degree of resiliency in the means 42. However, it will be appreciated also that some degree of resiliency may be incorporated as desired in certain applications of the present invention. Such resiliency may be the equivalent of either a compression type spring or a tension type spring or a neutral spring to provide a predetermined spring force in the elongated condition, the compressed condition or both.

Figure 6:
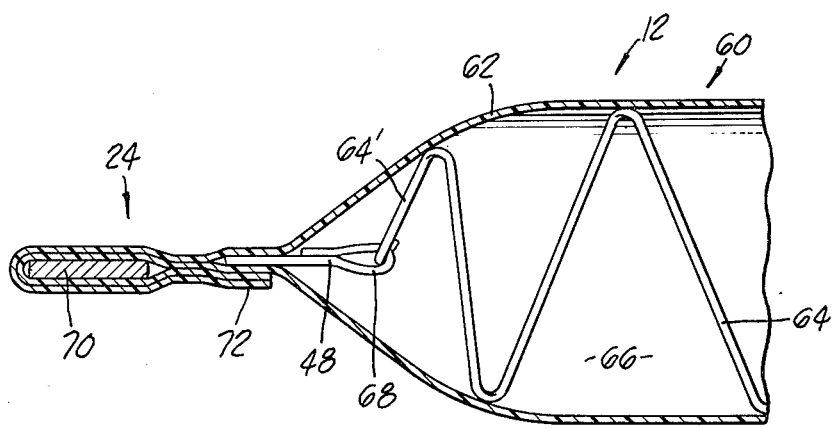
FIG. 6 illustrates another aspect of the embodiment of the invention shown in FIG. 2.

FIG. 6 illustrates another embodiment generally designated 60 according to the principles of the present invention. The embodiment 60 is generally similar to the embodiment 10 described above and is provided with a tubular member 62 similar to the tubular member 36 described above having a transversely rigid and longitudinally compressible-expandable means 64 in the cavity 66 defined by the tubular member 62. In the embodiment shown in FIG. 6 connection means 48 is provided by a loop member 68 coupled to the end 24 of the flotation means 12 and the end portion 64' of means 64 is inserted into the member 68 for retention therein. FIG. 6 also illustrates one type of end portion such as the first end 24 useful in the practice of the present invention wherein the tubular member 62 is doubled and folded around an attachment means 70 and bonded together generally in the area indicated at 72.

Figure 5:
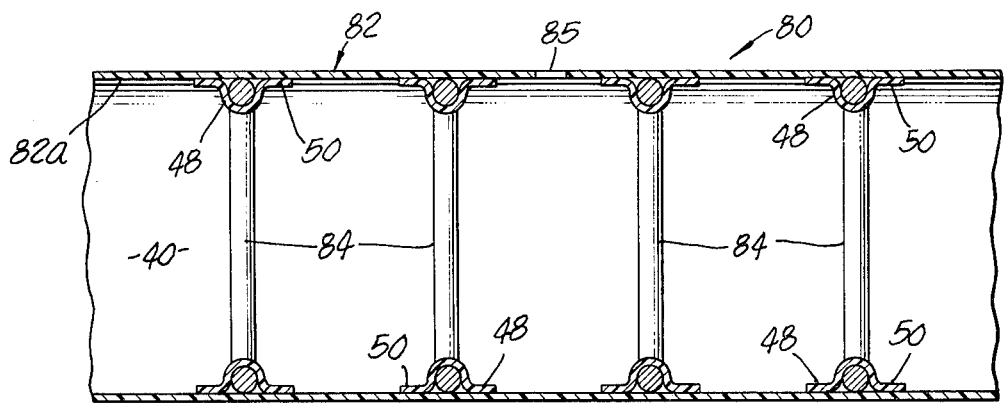
FIG. 5 illustrates another embodiment of the present invention.

FIG. 5 illustrates another embodiment of the present invention generally designated 80 having a tubular member 82 generally similar to the tubular member 36 described above. In the embodiment 80 shown in FIG. 5 the transversely rigid and longitudinally compressible-expandable means is provided by a plurality of rigid ring-like members 84 coupled to the internal surface 82a of the tubular member 82 by connecting means 48 which may take the form of the strap means 50 described above. The plurality of ring-like members are not directly coupled to each other and are spaced in a preselected array to provide the necessary degree of transverse rigidity to the tubular member 82.

A vent means, such as apertures 85, may be provided through the walls 38 of tubular member 36 to allow the flow of air into and out of the cavity 40. Additionally, the apertures 85 may be utilized for draining liquid from the cavity 40.

Anpother type of vent means 86, as shown in FIG. 1, may be provided for venting the cavity 40 of the tubular member 36. The vent means 86, as described below in greater detail, allows the flow of air between the cavity 40 and regions external the flotation means 12. Thus, upon compression of the containment boom section 10, air is expelled from the cavity 40 through the vent means 86 to allow the containment boom 10 to assume the compressed, storage condition. Upon deployment, air flows from regions external the flotation means 12 through the vent means 86 into the cavity 40 as the cavity 40 expands.

Figure 7:
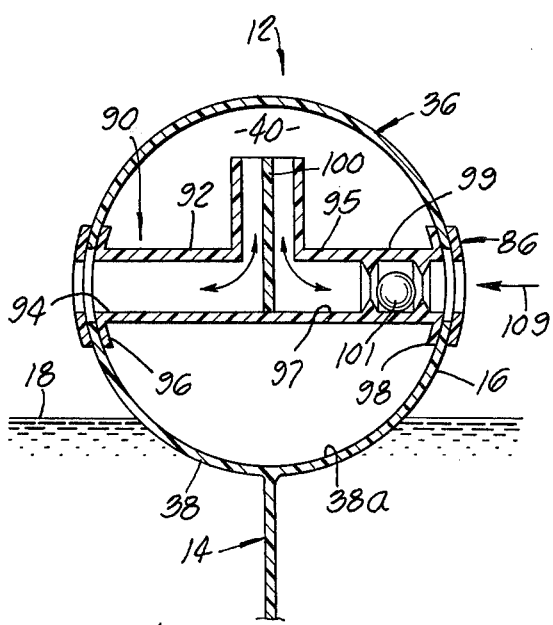
FIGS. 7 and 7A illustrate a vent means useful in the practice of the present invention.
Figure 7A:
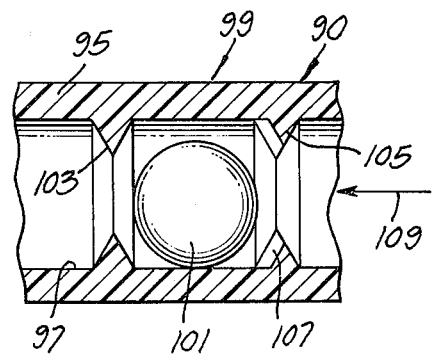

FIG. 7 illustrates one embodiment of the vent means 86 useful in the practice of the present invention. The vent means 86, as shown in FIG. 7, may be utilized where the cavity 40 is substantially continuous and thus only one or a comparatively few vent means are required. As shown, the vent means 86 is in the form of a generally T-shaped member having a tubular first member 90 having walls 92 defining a first passageway 94 leading into the cavity 40 from a first end 96 and walls 95 defining a second passageway 97 leading into the cavity 40 from the second end 98. The first end 96 is coupled to the inner surface 38a of the wall 38 of the tubular member 36 and the second end 98 is coupled in a transversely opposed relationship to the first end 96 to the inner surface 38a in upper portions 16 of the flotation means 12.

A separator 100 is coupled to the first tubular member 90 in the interior thereof to divide the interior into the first passageway 94 and second passageway 97. Thus, the vent means 86 as shown allows air to enter into the cavity 40 through the first and second passageways 94 and 97 and to leave via the same route during compression and deployment of the containment boom 10. The separator 100 prevents contamination from flowing through the boom 10.

To prevent liquid from entering into the cavity 40 when a vent means such as vent means 86 is utilized, it is preferred that a seal means 99 be utilized. The seal means 99 may incorporate a ball member 101 between sealing ridge 103 and ridge 105. Ridge 105 is provided with striations 107 to allow air or liquid to flow out of the passageway 97 for the condition of ball member 101 thereagainst. However, if liquid enters the passageway 97, in the direction of arrow 109, the ball member 101 seals against ridge 103 to prevent the passage of liquid therethrough.

In the embodiment 10 described above, and as in the other embodiments described below, the boom section 10 may be fabricated in comparatively long longitudinal lengths, such as, for example, 50 to 500 feet in length, or greater. The longer the longitudinal length, the lower the drag and the less turbulence produced when the boom is deployed. The lower drag results in lower forces needed for deployment and thus the boom is more easily deployed. The lower turbulence reduces the emulsifying of the contaminent with the liquid and thus reduces the tendency of the contaminent to pass under the boom section 10. Also, the manufacturing and operational costs are lowered since fewer end connections are required.

Further, from the construction shown, it can be seen that the boom section 10, as well as the other embodiments described herein, is capable of articulation in both the vertical and horizontal directions to assume shapes as induced by the forces imposed thereon during operation with comparatively low stresses imposed thereon. This not only increases operational life but also reduces splash-over of the contaminated liquid to regions outside the contained area. The boom section 10 is thus more efficient for the purposes intended because it substantially maintains the same cross-sectional configuration despite articulation and maintains substantially the same freeboard and draft.

In the stored condition, the boom 10 will occupy a volume on the order of 10% to 15% of the depolyed volume while maintaining substantially at the same cross-sectional configuration, except for the accordion-like folds. Other embodiments as described below, may occupy up to 20% to 50% of the depolyed volume when in the storage condition.

In the embodiments described above, the containment boom 10 was essentially submersible. That is, if the cavity 40 is filled with the liquid, the containment boom 10 may be submersed. In some applications of the present invention, it may be desired to compartmentalize the cavity 40. FIGS. 8 and 9 illustrate an embodiment generally designated 110 generally similar to the embodiment 10 described above and provided with a tubular member 36' having walls 38' with internal surfaces 39a' defining a cavity 40'. A transversely rigid and longitudinally compressible-expandable means 42', which may be similar to the member 42 described above is positioned in the cavity 40' and may be retained therein in the manner described above in connection with FIG. 3, 4, or 6. Plurality of barrier means 112 are in the cavity 40' in a spaced apart relationship and each of the barrier means 112 extends transversely across the cavity 40' for dividing the cavity 40' into a plurality of compartments 114, 116, and 118. The barrier means 112 may be in the form, as illustrated in FIGS. 8 and 9, of a thin, flexible diaphragm-like member coupled substantially continuously around the periphery thereof in a substantially watertight sealing relationship to the internal walls 38a' to provide that each of the compartments 114, 116, and 118 are substantially watertight compartments. The means 42' extends through each of the barrier means 112 in a substantially watertight sealing relationship.

Vent means 85' are provided in the walls 38' of the tubular member 36', and, in the embodiment shown in FIGS. 8 and 9, comprise apertures 120 in each of the compartments 114, 116, and 118 to provide communication between each compartment and regions external the flotation means 12'. In the embodiment 110 the spacing of the barrier means 112 may be selected so that anticipated rupture of the wall 38' for a predetermined length and consequent flooding of one or more of the compartments 114, 116, and 118, will still allow positive buoyancy of the flotation means 12'.

As illustrated in FIG. 9, if desired, the barrier means 112 may not extend completely around the periphery thereof in watertight sealing relationship to the walls 38' but, alternatively, may be provided with walls 122 defining an aperture therein to provide an air passageway 124 between adjacent compartments. When the air passageway 124 is provided, a single venting means such as that illustrated in FIG. 7, may be utilized in the boom section. Similarly, if such an aperture providing the passageway 124 is provided the transversely rigid and longitudinally compressible-expandable means 42' may extend through that passageway.

It will be appreciated, of course, that in all of the embodiments of the present invention, the transversely rigid and longitudinally compressible-expandable means may take the form illustrated, for example, in FIG. 2 or, alternatively, in the form illustrated in FIG. 5, depending upon the particular application. Additionally, other forms and configurations may be utilized to provide the necessary transverse rigidity and yet longitudinal compression-expansion characteristics as described above.

The barrier means 112, as shown in FIG. 8 and 9 may also take the form of a longitudinally thin, transversely rigid disc-like member. In such an embodiment, the barrier means 112 provides a dual function of both a barrier and as the transversely rigid and longitudinally compressible-expandable means. Therefore, if the barrier means 112 are rigid discs, the transversely rigid and longitudinally compressible-expandable means 42' may be omitted.

FIG. 9A illustrates another barrier means generally designated 130 useful in the practice of the present invention which may be utilized to repalce or be attached to the barrier means 112 illustrated in FIGS. 8 and 9. The barrier means 130 has a predetermined longitudinal thickness "L" and a specific gravity less than 1.0. Thus, the barrier means 130 may comprise a flotation disc 131 fabricated of, for example, expanded polyurethane foam, any open or closed cellular plastic construction or the like. Similarly, as shown in FIG. 9B, the barrier means 112 may be in the form of a rigid walled, hollow cylindrical section 135 having end caps 137 and 139 sealed thereto, as at 141 and 143 in a watertight sealing relationship. It will be appreciated that shapes other than cylindrical may be utilized to help achieve any desired transverse cross-sectional configuration. The spacing, number and longitudinal thickness "L" of such flotation discs 131 may be selected to provide any desired degree of buoyancy. The longitudinal thickness "L," the number and/or spacing of such flotation discs 131 as selected represents a design compromise between considerations of minimizing compressed or stored volume and/or weight and maximizing degree of buoyancy. The flotation discs 131 may be bonded continuously to the walls 38' in a watertight sealing relationship to divide the cavity 40' into a plurality of watertight compartments, as described above, or, alternatively, an aperture, defined by walls shown in dotted lines 133 on FIG. 9A, 132 may be provided to provide communication between adjacent compartments. Alternatively, the flotation discs 131 may be bonded to barrier means 112 described above.

Figure 11:
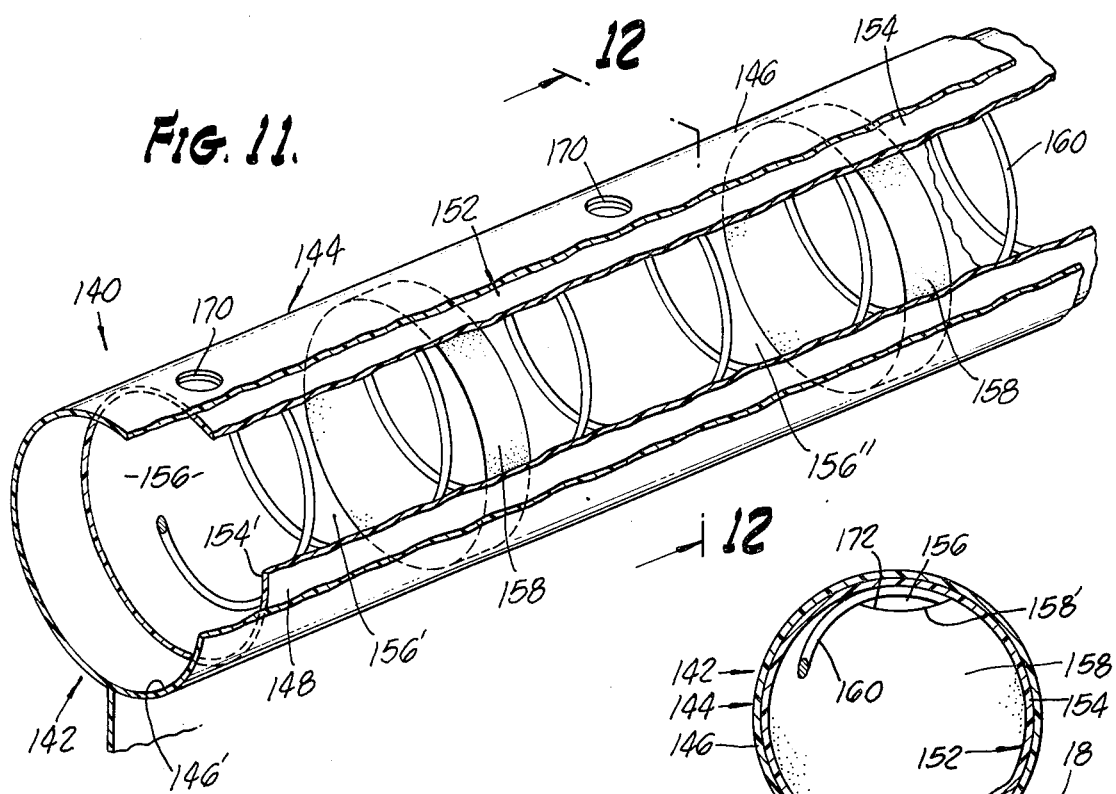
FIG. 11 is a perspective view partially in section of another embodiment of the present invention.
Figure 12:
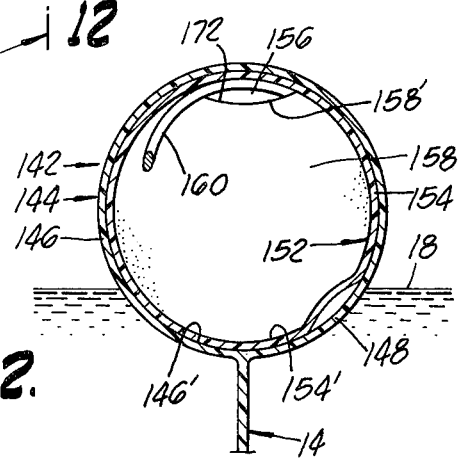
FIG. 12 is sectional view of the embodiment shown in FIG. 11.

FIGS. 10, 11, and 12 illustrate another embodiment, generally designated 140 useful in the practice of the present invention. As shown, the embodiment 140 may comprise a flotation means 142 generally similar to the flotation means 12 described above and provided with an elongated flexible, generally tubular, outer covering member 144 having walls 146 with inner surfaces 146' defining an internal cavity 148. The tubular member 142 is longitudinally compressible-expandable between a compressed, storage condition and an elongated, deployed condition and has a first degree of flexibility. A first end 150 of the containment boom 140 is illustrated in FIG. 10 and has an attachment means 70' thereof generally similar to the attachment means 70 described in connection with FIG. 1.

A flexible liner means 152 is contained within the cavity 148 and has a second degree of flexibility which, preferably is greater than the first degree of flexibility of the tubular member 142. The liner means 152 is adjacent the inner surfaces 146' of the walls 146 of the tubular member 144 and is substantially coextensive therewith. The liner means 152 may be bonded or otherwise secured to the tubular member 144 at predetermined locations which may be continuous, throughout the length thereof, at the ends, such as an end 150 thereof, or in any combination thereof.

The liner 152 has walls 154 having inner surfaces 154' defining a liner cavity 156.

A plurality of flotation discs 158 are positioned in the liner cavity 156 and may, for example, be bonded to the liner of wall 154 on the internal surface 154' thereof in a predetermined spaced array throughout the longitudinal length of the liner 152. The flotation discs 158 may be similar to the flotation disc 130 illustrated in FIG. 9A or 9B and the thickness, number, spacing and specific gravity thereof may be selected in accordance with the principles set forth above.

A transversely rigid and longitudinally compressible-expandable means 160, which may be similar to the means 42 described above is also positioned in the liner cavity 156 and connecting means 162 which, for example, may be similar to the connecting means 50 described above in connection with FIGS. 3 and 4, may be utilized to retain the transversely rigid and longitudinally compressible-expandable means 160 in the liner cavity 156.

The means 160 may be similar to the means 42 or the means 84 described above, or rigid barrier means 112 described above.

For the embodiment wherein the flotation discs 158 are bonded substantially continuously around the periphery thereof and are in the predetermined cross-sectional configuration of the tubular member 144 to divide the liner cavity 156 into a plurality of separate compartments 156' and 156", as illustrated in FIG. 11, the vent means 170 must be provided in each of the compartments 156' and 156" and as illustrated in FIG. 11 they comprise apertures through the walls of the liner means 152 and tubular member 144 to allow the flow of air from the minor cavity 156 to regions external the containment boom.

As illustrated in FIG. 12 the flotation discs 158 may be provided with walls 158' defining an air flow passage 172 providing communication between each of the compartments 156' and 156". For such an embodiment a single vent means, such as the vent means 90 described in connection with FIG. 7 may be utilized. In such an embodiment, it is preferred that the transversely rigid and longitudinally compressible-expandable means 160 when in the form shown in FIGS. 10, 11, and 12 extend through the passageway 172.

Figure 13:
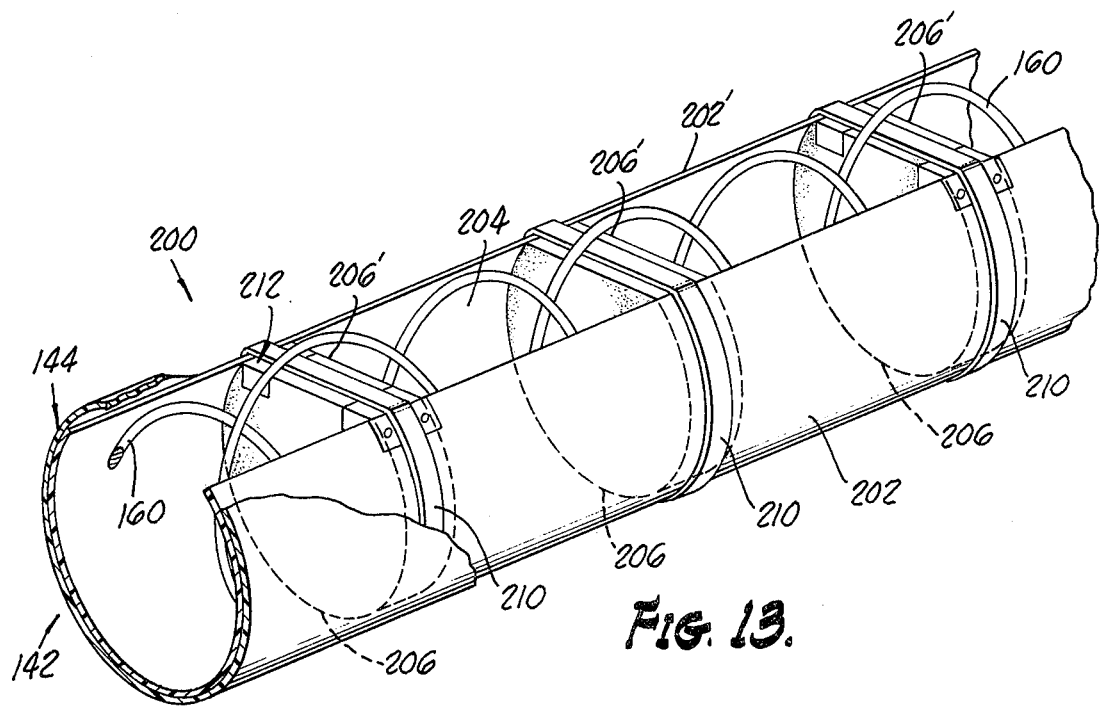
FIG. 13 is a perspective view, partially in section, of another embodiment of the present invention.
Figure 21:
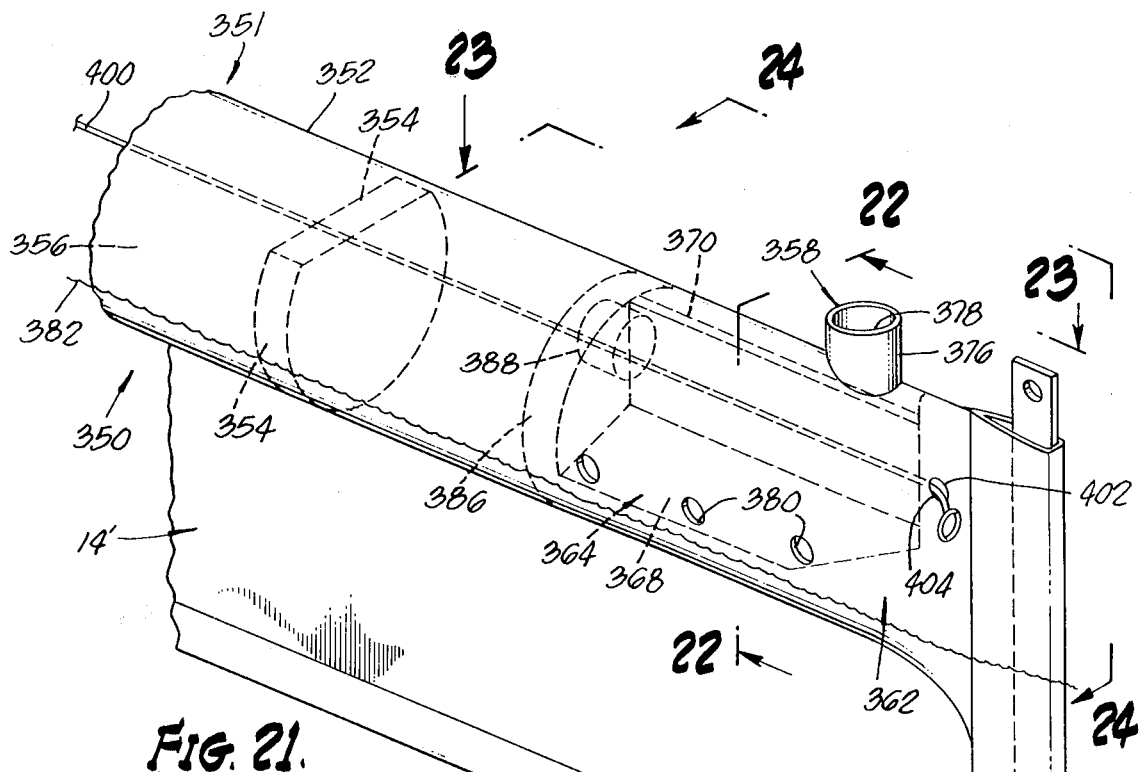
Figure 22:
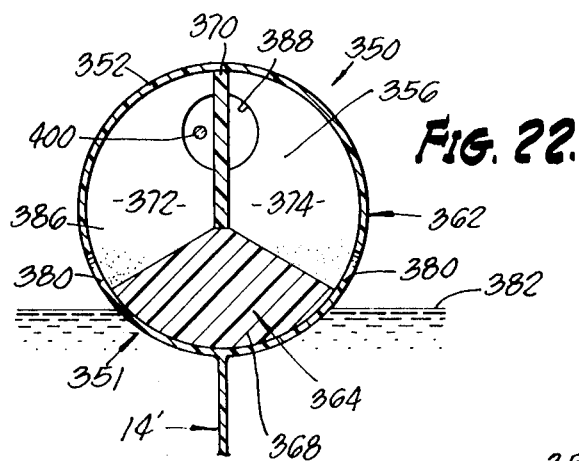

FIGS. 13, 14, and 15 illustrate another embodiment of the present invention, generally designated 200 which is generally similar to the embodiment 140 described above. In the embodiment 200, there is provided a liner means 202 which is generally similar to the liner means 152 described above except it is provided with wall portions 202' defining an aperture 204 extending substantially the continuous length of the liner means 202. The flotation discs 206 are generally similar to the flotation of 158 described above except they are truncated along top portions 206' thereof corresponding to the aperture 204 in the liner 202. The flotation discs 206 may be bonded to the liner 202 and, additionally, a tension strap means 210 may be utilized to retain the flotation discs 206 at the proper predetermined spaced array thereof. As shown in FIG. 13, the tension strap 210 is on the external wall surface of the liner means 202. This is illustrated in greater detail in FIG. 14. As shown in FIG. 14 the tension strap 210, which may be fabricated of metal, plastic, or similar materials, and may, for example, be similar to the tension straps conventionally utilized in packaging arrangements, is in the cavity 148 between the tubular member 144 and the liner means 202 and thus clamps the liner and flotation discs together.

Additionally, it may be desired to provide a positive connection between the tubular member 144, liner means 202 and flotation discs 206. One such arrangement is illustrated generally at 212 in FIG. 13 and in detail in FIG. 15. As shown in FIG. 15 the flotation disc 206 is provided with a rigid walled metallic or plastic cap-like member 220 in regions adjacent the truncated portion 206'. The liner means 202 extends over the cap-like member 220 and an aperture 222 is provided in the cap-like member 220 for receiving, for example, a self tapping sheet metal screw 224 which extends through the tubular member 144, past the tension strap 210, through the liner means 202 and into the cap-like member 220 and, if desired, into the flotation disc 206. Thus, the tubular member 144, liner means 202, straps 210 and flotation discs 206 are secured to each other to provide relative movement therebetween. In the embodiment 200 since a continuous passageway is provided in the internal cavity 204 defined by the liner means 202, one or a comparatively few, vent means such as that illustrated in FIG. 7 may be utilized.

FIG. 15A illustrates another embodiment, generally designated 212' for providing connection between a tubular member 144', a liner means 202' and flotation disc 206'. In this embodiment 212', the liner means 202' is adjacent the flotation disc 206', and the cap-like member 220' is intermediate the tubular member 144' and the cap-like member 220° and screw means 224' extends in aperture 222'. Strap means 210' is positioned between the cap-like member 220' and the tubular member 144'.

FIG. 16 illustrates another embodiment of the present invention generally similar to the embodiment illustrated in FIG. 13 wherein a strap means 210 is provided for retaining a flotation disc 206 in a predetermined spaced array within the liner means 202 contained within a tubular member 144. A transversely rigid and longitudinally compressible-expandable means 160 is provided extending through an aperture 172 and may be coupled to an arch means 240. The strap means 210 also extends through the arch means 240 as illustrated at 242. The arch means 240 ensures that the aperture 172 remains open to provide communication throughout the extended length of the liner cavity 204 for proper aspiration thereof during compression and deployment. The means 160 may, if desired, be coupled to the arch means 240 as illustrated 246. The strap means 210 may, if desired, extend over the arch means 240, rather than through the arch means 240 as illustrated.

FIGS. 17 illustrates an embodiment of the invention generally similar to the embodiment shown in FIGS. 10 and 13 and shows the coupling of the tension means 160 by means of a coupling means 68' generally similar to the coupling means 68 shown above in FIG. 6.

FIG. 18 illustrates another embodiment of the invention generally designated 260 generally similar to the embodiment shown in FIG. 10 having a tubular member 144' and a liner means 152' with a plurality of flotation discs 158' contained in the liner means 152'. In the embodiment shown in FIG. 18, a transversely rigid and longitudinally compressible-expandable means 160', which may be similar to the means 160 described above, is positioned between the tubular member 144' and the liner means 152' in the cavity 148'.

It will be appreciated that the flotation discs described herein may, if desired, also comprise the transversely rigid and longitudinally compressible-expandable means and function in a manner similar to the rings 84 described above. In such an arrangement, therefor, no separate transversely rigid and longitudinally compressible-expandable means need be incorporated. Thus, the flotation discs, in such an arrangement, together with the tubular member and/or the liner means, provide the desired functional relationship, according to the present invention, of both transverse rigidity and longitudinal compression and expansion capability.

It will be appreciated that the various arrangements illustrated in FIGS. 13, 14, 15, and 16, for example, may also be utilized in the embodiment 260 shown in FIG. 18.

FIG. 19 illustrates another embodiment of the present invention generally designated 270. As shown in FIG. 19 there is provided an elongated flexible generally tubular member 272 similar to the tubular member 36 described above in connection with FIGS. 1 and 2. However, in this embodiment 270 of the present invention, a transversely rigid and longitudinally compressible-expandable means 42", which may be generally similar to the transversely rigid and longitudinally compressible-expandable means 42 shown in FIG. 2 is embedded in, such as by molding, the wall 273 of the tubular member 272. Thus, the transversely rigid and longitudinally compressible-expandable means 42" maintains a predetermined cross-sectional configuration of the tubular member 272 to provide the desired shape of the cavity 274 defined by the internal surface 272'. In such an embodiment 270, of course, the transversely rigid and longitudinally compressible-expandable means 42" does not require any separate connection means since it is connected to the tubular member 272 substantially continuously throughout the length.

It will be appreciated, of course, that a similar arrangement as shown in FIG. 19 may be utilized for embedding, such as by molding, the transversely rigid and longitudinally compressible-expandable means in the wall of the liner means such as the liner means 152 described in connection with FIG. 11 to provide the same desired affect.

Additionally, in the embodiment 140 shown in FIGS. 10 and 11, it will be appreciated that the flotation discs 158 may be omitted if desired to provide an embodiment wherein the tubular member is provided with the liner means and the transversely rigid and longitudinally compressible-expandable means is in the cavity defined by the liner means without the provision of any flotation discs or other barrier means.

Additionally, it will be appreciated that in the embodiments of the present invention wherein a liner means is provided inside the tubular member, the transversely rigid and longitudinally compressible-expandable means may take the form of a plurality of spaced apart rigid disc members in the cavity defined by the liner means, such as that described above in connection with the embodiment 110 illustrated in FIGS. 8 and 9. Thus, such rigid discs would be in the form of a barrier means 112 shown in FIGS. 8 and 9 to provide the function of both the barrier means for dividing the liner cavity into a plurality of compartments as well as providing the function of the transversely rigid and longitudinally compressible-expandable means.

It will be appreciated that the construction of the embodiment 10 shown in FIGS. 1 and 2, as well as the other embodiments described herein may also be incorporated in a boom or barrier arrangement in which the tubular member is divided into sections. FIG. 20 illustrates one such embodiment, generally designated 300 in which a tubular member 302, generally similar to the tubular member 36 described above is divided into a plurality of compartments 301, 303, and 305 by, for example, bonding the walls 304 thereof together as indicated at 306. Each compartment 301, 303, and 305 is provided with a vent means comprising an aperture 308, 308' and 308" respectively and a transversely rigid and longitudinally compressible-expandable means 310, 310' and 310", respectively, which may be similar to the means 42 described above. Barrier means 312, which may be similar to the flotation discs 130 described above may also be provided. In this embodiment 300, each area of bonding 306 acts as a hinge point for flexibility of the boom end thus comprise the ends of each compartment suitable connecting means 314 similar to connecting means 48 described above, may also be provided for retaining the transversely rigid and longitudinally compressible-expandable means 310, 310' and 310″ in each compartment 301, 303 and 305, respectively.

In an embodiment of the present invention that has been fabricated substantially in accordance with the embodiment 140 illustrated in FIG. 10, it has been found that for a longitudinal length on the order of 100 ft., the transversely rigid and longitudinally compressible-expandable means comprise a ⅛ inch diameter stainless steel wire helically wound throughout the length in approximately two coils per foot. Flotation discs were spaced approximately every 2 feet and had the external configuration substantially corresponding to the desired predetermined transverse cross-sectional configuration for the tubular member which, in this structure actually fabricated, was circular. The flotation discs were bonded in the internal walls of the liner and the collapsed length of the 100 ft. boom was approximately 20 ft. The outside diameter of the tubular member was approximately 12 inches. The flotation discs were truncated across upper portions thereof similar to the arrangement shown in FIG. 12 for the flotation disc 158 to divide the internal cavity of the liner means into a plurality of cavity compartments with air communication between the compartments provided by the apertures in the flotation discs.

The material from which the tubular member may be fabricated is preferably waterproof and having a comparatively high abrasion resistance. Such materials may comprise plastic or elastomeric, such as polyvinylchloride, polyurethane coatings on fabrics such as dacron, nylon, cotton, glass fibers, or the like. The liner may be fabricated from the same or other material except, to provide the greater flexibility desired in preferred embodiments of the present invention, it should be fabricated from a thinner wall structure. In the fabricated structure described above, the wall thickness of the tubular member was on the order of 0.03 inch and the wall thickness of the liner means was on the order of 0.02 inch thickness.

The flotation discs in this embodiment were fabricated from a rigid closed cell (polyurethane) plastic foam having a specific gravity of approximately 0.04. It was found that when the internal cavity of the liner was flooded and the skirt means attached to the tubular member had approximately 0.75 lbs, per foot as ballast, the tubular member floated in water with approximately 50% of its height above the surface level of the liquid and approximately 50% of its height below the surface level of the liquid.

In some applications of the present invention it may be desirable to provide a special buoyancy and/or liquid drain section as the vent means. Such an embodiment may be utilized where there is communication between the vent means and extended lengths of the cavity of the tubular member or the liner cavity. Therefore, such an embodiment of a buoyant section for a vent means which may also be utilized as the drain means for removing any liquid which may have entered the boom, may be utilized in any of the embodiments of the present invention described above.

FIGS. 21, 22, 23 and 24 illustrate one embodiment of such a vent means, generally designated 350, which is useful in the practice of the present invention. As shown in FIGS. 21, 22, 23, and 24, there is provided a flotation means generally designated 351 having a generally tubular member 352, which may be similar to the tubular member 36 described above and a dependent skirt section 14′ attached thereto which may be similar to the skirt section 14 described above. The tubular member 352 is provided with flotation discs 354 having a truncated top portion 354′ thereof positioned in the cavity 356 defined by the tubular member 352. The truncated portion 354′ allows communication for air passage throughout the cavity 356.

The vent means generally designated 358 is adjacent a first end 360 of the flotation means 351. However, it will be appreciated, the vent means 358 may be positioned at any longitudinal portion of the tubular member 352 as desired. The vent means 358 comprises a buoyancy section 362 having a buoyancy member 364 within the cavity 356 of the buoyancy member 352 adjacent the first end 360. The buoyancy member 364 has a base portion 368 positioned in the lower portion of the flotation means 351 and extending a predetermined distance upwardly into the upper portion of the flotation means 351. The buoyancy member 368 may be fabricated of any of the buoyant materials such as those described above in connection with the buoyancy discs 130 or 137 described above and has a specific gravity of less than 1.0.

A longitudinally extending divider portion 370 is coupled to the base portion 368 and divides the cavity 356 into a pair of longitudinal chambers 372 and 374 each of which are in communication with the remainder of the cavity 356. The longitudinally extending divider portion 370 may extend up to the walls of the tubular member 352 or may extend only into regions adjacent thereto.

The tubular member 352 has walls 376 defining a vent aperture means 378 therethrough to provide an airflow passageway between the two longitudinal chambers 372 and 374 in regions external the flotation means 351.

The tubular member 352 is also provided with drainhole walls 380 providing communication between the two longitudinal chambers 372 and 374 in regions external the flotation means 351. The drainholes 380 are above the liquid level 382 to allow any water which may have entered the longitudinal compartments 372 and 374 to drain therefrom.

An end barrier means 386 is also provided with an aperture 388 therethrough to provide the communication above described to the longitudinal chambers 372 and 374. The end barrier means 386 may be fabricated of the same material as the lower portion 368 of the buoyancy section 364.

Figure 23:
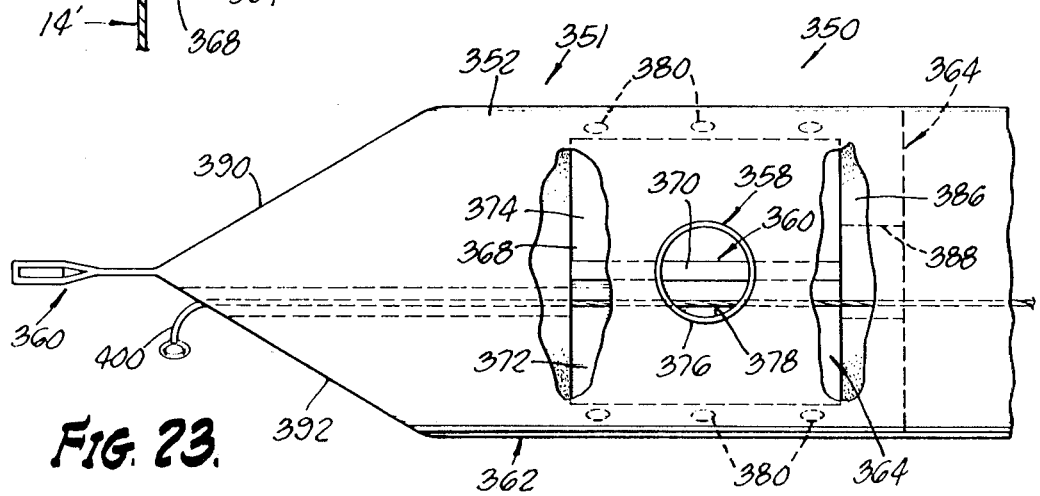
Figure 24:
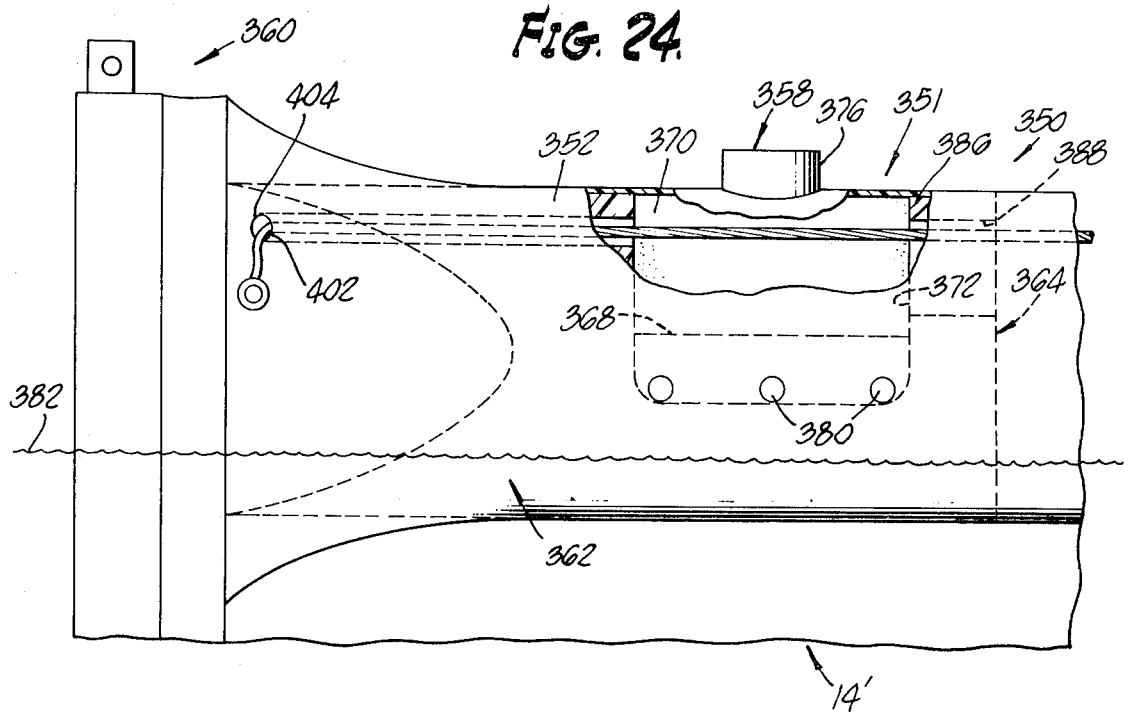

In the embodiment 350 as shown in FIG. 23, the tubular member 352 as well as the buoyancy member 364 are longitudinally tapered as at 390 and 392. It has been found that, for example, during deployment when the containment boom section shown in the embodiment of 350 is deployed by towing, for example, at the tow hole 394 the tapered portion adjacent the end 360 reduces drag and turbulence and provides for easier deployment to allow more rapid deployment of the boom.

It will be appreciated, of course, that the longitudinal length of the buoyancy section 362 is not longitudinally compressible and expandable. Consequently, in preferred embodiments of the present invention, the buoyancy section 362 is on the order of 1 to 3 feet in length in order to minimize the storage condition volume. Further, since the buoyancy section 362 is not longitudinally compressible-expandable because of the nature of the buoyancy member 364, the walls of the tubular member 352 in the buoyancy section 362 may be fabricated from a rigid material, such as thin sheet metal, or the like. and secured to the remainder of the tubular member 352.

In the embodiment 350 illustrated in FIGS. 21, 22, 23, and 24, the transversely rigid and longitudinally compressible-expandable means is comprised of the flotation discs 354 and the tubular member 352. However, it will be appreciated that a transversely rigid and longitudinally compressible-expandable means such as the means 42 described above may equally well be utilized in the tubular member 352 and, if desired, extending into the buoyancy section 362. Such an arrangement, of course, may be desirable in particular when the buoyancy section 362 is positioned intermediate the ends of the tubular member 352 rather than adjacent the first end 360 thereof as illustrated and thus may extend continuously through the buoyancy section.

Additionally, in many applications of the present invention, including the embodiments described herein, it may be desirable to provide a drawstring means such as a rope 400 extending from the first end and connected to a portion of the boom spaced therefrom in the cavity defined by the tubular member 352 or, alternatively, in the cavity defined by a liner means when such a liner is utilized. Thus, the rope 400 extends through a drawstring aperture 402 defined by drawstring walls 404 in the tubular member 352 adjacent the first end 360. Since the second end of the rope means 400 is coupled to the second end of the boom (not shown) when it is desired to compress the boom section, the drawstring 400 may be pulled thereby pulling together the boom section. It will be appreciated that utilization of the draw string means 400 is not limited to the embodiment shown in FIGS. 21, 22, 23, and 24 but may equally well be utilized in the embodiments described above and as set forth hereinafter.

The longitudinally extending divider portion 370 described above may be of a rigid material or of a flexible material. Additionally, it may also be fabricated of the same material of the base portion 368.

As noted above, the vent means of a type such as illustrated in FIGS. 21, 22, 23, and 24 may also be incorporated intermediate the ends of the boom rather than adjacent one end thereof and may be incorporated in the embodiments of the invention described above. For example, it may be incorporated in an embodiment such as that shown in FIG. 20.

Such an arrangement is illustrated in FIGS. 25 and 26 wherein there is shown an embodiment generally designated 410 of the present invention incorporated in a containment boom 412 generally similar to the embodiment 300 described above. The vent means 410 is generally similar to the vent means 362 and is comprised of a base portion 368' and a longitudinally extending divider portion 370' dividing the liner cavity 414 defined by the liner means 416 contained within a tubular member 418 of a containment boom 420 generally similar to the containment boom 300. A transversely rigid and longitudinally compressible-expandable means 422 which may be similar to the means 42 described above extends in the liner cavity 414 including the buoyancy section 412.

End barrier means 386' are provided at each end of the buoyancy section 412 and are similar to the end barrier means 386 described above. Drain apertures 380' which are similar to the drain apertures 380 described above are also provided as is a vent aperture 378'.

Drawstring means 400' is also provided in the embodiment 410. Two drawstring means are provided to achieve the same function as the drawstring 400 described above. In the embodiment 410, the tubular member 418 of the containment boom 420 has the walls thereof bonded together as indicated at 430 to divide the containment boom into a plurality of individual sections in the manner similar to that described above in connection with FIG. 20.

In the embodiment 450 illustrated on FIG. 27, a vent means 452 which comprises a buoyancy section 454 generally similar to the buoyancy section 368 described above in connection with FIGS. 21, 22, 23, and 24, is provided, except that the barrier means 456 is fabricated of a rigid walled tubular section such as the buoyancy disc 137 illustrated in FIG. 9B above. The buoyancy section 454 is fabricated as a separate unit from the containment boom 458 and may be detachably coupled thereto. In such an embodiment, the end flotation disc 460 of the boom section 458 is also fabricated of a rigid walled tubular member such as that illustrated in FIG. 9B and quick connect means such as the prong and keyhole type means 462 are provided on each of the discs 456 and 460 in matching relationship to allow quick connection thereof. In the embodiment 450 the walls of the tubular member 458' in the buoyancy section 454 may be fabricated of a rigid material such as plastic, sheet metal or the like, as described above. The embodiment 450 may be utilized to aid in the rapid deployment of the containment boom 458. A drawstring means 400', which may be generally similar to the drawstring means 400 described above is provided in the buoyancy section 454 and may be connected to the drawstring 400" extending through the containment boom 458.

In these embodiments of the present invention in which drain holes, such as drain holes 380 shown in FIGS. 21, 22, 23 and 24, it may be desirable to provide means for minimizing the entry of liquid into the boom cavity therethrough. Such entry may occur, of course, during towing on deployment and retrieval, or at other times.

FIGS. 28 and 29, illustrates an embodiment generally designated 500, for providing a means for minimizing the entry of liquid. As illustrated, there is a tubular member generally designated 502, which may be similar to the tubular members described above, provided with walls defining a plurality of drain apertures 504 therethrough similar to the drain apertures 380 described above.

A flap means 506 is provided over each of the apertures 504 and, as illustrated, the flap means 506 are bonded or otherwise secured to the tubular member 502 in longitudinally spaced areas, as indicated at 508, adjacent each aperture 504. The flap means 506 are preferably fabricated from a flexible material and, therefore, may be fabricated from the same material as the tubular member 502.

As shown, the flap means 506 are spaced from the tubular member 502 in areas between the bonding portions 508, as indicated in FIG. 29 at 510.

In operation, during towing on deployment or retrieval, which may be in the direction of the arrow 512, the force of the liquid on the flap means 506 may be in the opposite direction as indicated by the arrow 514. Such force tends to act on the flexible flap means to cause them to cover the apertures 504, thus minimizing the amount of liquid which may enter therethrough.

This concludes the description of the preferred embodiments of the present invention. Those skilled in the art may find many variations and adaptations thereof and the appended claims are intended to cover all such variations and adaptations falling within the true scope and spirit of the invention.

We claim:

1. In an improved containment boom section, the improvement comprising, in combination:

flotation means having a predetermined buoyancy to provide upper portions thereof above the surface level of a liquid body for the condition of the boom section in the liquid body, and a lower portion below the surface level;

said flotation means comprising:

an elongated, flexible, generally tubular member having walls having internal surfaces defining an internal cavity and having a first end and a second end, and longitudinally compressible-expandable between a compressed, storage condition and an elongated, deployed condition;

a transversely rigid and longitudinally compressible-expandable means substantially free of longitudinal resilient forces in said cavity extending substantially from said first end to said second end of said tubular member and bearing against said internal surfaces of said walls of said tubular member for maintaining a predetermined transverse cross-sectional configuration of said tubular member in said compressed and said elongated condition;

connection means coupled to said tubular member for connecting said transversely rigid and longitudinally compressible-expandable means to said tubular member; and vent means in said tubular member in regions adjacent said upper portion of said flotation means for providing an air passageway between said cavity and regions external said flotation means.

2. The arrangement defined in claim 1 wherein: said transversely rigid and longitudinally compressible-expandable means comprises a wire means extending from said first end to said second end of said tubular member in a generally helical configuration.

3. The arrangement defined in claim 1 wherein: said transversely rigid and longitudinally compressible-expandable means comprises a plurality of ring-like members in a spaced array between said first end and said second end of said tubular member.

4. The arrangement defined in claim 2 wherein: said connection means comprises a first connecting member coupled to said tubular member adjacent said first end thereof for connecting a first end of said transversely rigid and longitudinally compressible-expandable means thereto and a second connecting member coupled to said tubular member adjacent said second end thereof for connecting a second end of said transversely rigid and longitudinally compressible-expandable means thereto.

5. The arrangement defined in claim 4 wherein: said connection means comprises a plurality of third connecting members in spaced array coupled to said tubular member intermediate said first and second ends thereof for connecting said transversely rigid and longitudinally compressible-expandable means to said walls of said tubular member at predetermined locations.

6. The arrangement defined in claim 1 and further comprising:

a plurality of barrier means in said cavity in a spaced apart relationship, and each of said barrier means extending transversely across said cavity for dividing said cavity into a plurality of compartments; and said vent means comprises means for venting each of said compartments to regions external said flotation means.

7. The arrangement defined in claim 6 wherein: each of said barrier means comprises a thin, flexible diaphragm-like member coupled to said internal surface of said walls of said tubular member substantially continuously around the periphery thereof in a substantially watertight sealing relationship;

said transversely rigid and longitudinally compressible-expandable means extends through each of said barrier means in a substantially watertight aperture therethrough.

8. The arrangement defined in claim 7 wherein: said vent means comprises wall portions defining an aperture in said walls of said tubular means in regions adjacent said upper portion of said flotation means in each of said plurality of compartments.

9. The arrangement defined in claim 6 wherein: said barrier means has a predetermined buoyance and comprises:

a plurality of flotation discs having a predetermined longitudinal thickness and having a specific gravity less than 1.0.

10. The arrangement defined in claim 9 wherein: each of said plurality of flotation discs has said predetermined cross-sectional configuration of said tubular member and are bonded to said inner surface of said walls of said tubular member.

11. The arrangement defined in claim 10 wherein: said bonding of said flotation discs to said inner surface of said walls of said tubular member is substantially watertight and substantially continuous around the peripheries thereof;

said vent means comprises wall portions in said walls of said tubular member defining an aperture therethrough in regions adjacent said upper portion of said flotation means in each of said compartments.

12. The arrangement defined in claim 9 wherein: said vent means further comprises:

aperture means in each of said flotation discs in regions adjacent said upper portion of said flotation means to provide an air passage between adjacent compartments.

13. The arrangement defined in claim 9 wherein: said predetermined buoyancy is selected to provide at least neutral buoyancy for the condition of each of said compartments substantially filled with the liquid.

14. The arrangement defined in claim 9 wherein: said predetermined buoyancy is selected to provide approximately 50% of the volume of said tubular member in said upper portion of said flotation means for the condition of said compartments substantially filled with said liquid.

15. The arrangement defined in claim 12 wherein said vent means further comprises:

a first tubular vent member in said cavity having walls defining a first passageway and having a first end and a second end, and said first end coupled to said walls of said flotation means in said upper portions thereof and said second end in said upper portion of said flotation means in said cavity providing communications through said first passageway from said cavity to regions external said flotation means; and a second tubular vent member in said cavity having walls defining a second passageway and a first end of said second tubular vent member coupled to said walls of said flotation means in opposed relationship to said first end of said first tubular vent member and a second end thereof in said upper portion of said flotation means in said cavity providing communication between regions external said flotation means and said cavity.

16. In an improved containment boom section, the improvement comprising, in combination:

flotation means having a predetermined buoyancy to provide upper portions thereof above the surface level of a liquid body for the condition of the boom section in the liquid body and a lower portion below the surface level;

said flotation means comprising:

an elongated, flexible, generally tubular outer covering member having walls defining an internal cavity and having a first end and a second end, and longitudinally compressible-expandable between a compressed, storage condition and an elongated, deployed condition and having a first degree of flexibility;

a flexible liner means in said cavity and adjacent inner surfaces of said walls of said tubular member, and said liner means having walls having inner surfaces defining a liner cavity substantially coextensive with said cavity of said tubular member, and said liner means having a second degree of flexibility;

a transversely rigid and longitudinally compressible-expandable means in said liner cavity extending substantially from said first end to said second end of said tubular member and bearing against internal surfaces of said walls of said liner means for maintaining a predetermined transverse cross-sectional configuration of said liner means and said tubular member;

connection means coupled to said liner means for connecting said transversely rigid and longitudinally compressible-expandable means to said liner means; and vent means in said tubular member and said liner means in regions adjacent said upper portion of said flotation means to allow passage of air into and out of said cavity of said tubular member and said liner cavity.

17. The arrangement defined in claim 16 and further comprising:

a plurality of flotation discs in a predetermined spaced array having a predetermined longitudinal thickness and a predetermined buoyancy in said liner cavity and extending transversely thereacross to divide said liner cavity into a plurality of liner compartments, and said flotation discs having a specific gravity less than 1.0 and said liner means having first wall portions defining aperture means therethrough for providing airflow passageway means between said liner cavity and said cavity of said tubular member.

18. The arrangement defined in claim 16 wherein:

said transversely rigid and longitudinally compressible-expandable means comprises a wire means extending from said first end to said second end of said tubular member in a generally helical configuration.

19. The arrangement defined in claim 16 wherein:

said transversely rigid and longitudinally compressible-expandable means comprises a plurality of ring-like members in a spaced array between said first end and said second end of said tubular member.

20. The arrangement defined in claim 18 wherein:

said connection means comprises a first connecting member coupled to said liner means adjacent said first end of said tubular member for connecting a first end of said transversely rigid and longitudinally compressible-expandable means thereto and a second connecting member coupled to said liner means adjacent said second end of said tubular member for connecting a second end of said transversely rigid and longitudinally compressible-expandable means thereto; and means for connecting said liner means to said tubular member.

21. The arrangement defined in claim 17 wherein:

said flotation discs have a cross-sectional configuration at least partially corresponding to said predetermined cross-sectional configuration of said tubular member.

22. The arrangement defined in claim 21 wherein:

at least a portion of said plurality of flotation discs are bonded to said inner surface of said walls of said liner means.

23. The arrangement defined in claim 22 wherein:

said bonding of said flotation discs is substantially watertight and substantially continuous around the periphery thereof;

said vent means comprises wall portions in said walls of said tubular member and said liner means defining an aperture therethrough in regions adjacent said upper portion of said flotation means adjacent each of said liner compartments.

24. The arrangement defined in claim 21 wherein:

at least a portion of said flotation discs have wall portions defining an aperture means therethrough in said upper portion of said flotation means to provide an airflow passage between adjacent liner compartments.

25. The arrangement defined in claim 22 and further comprising:

a plurality of tension strap members positioned between said liner means and said tubular member and extending around each of said flotation discs to maintain said flotation discs in said predetermined spaced array.

26. The arrangement defined in claim 25 wherein:

at least a portion of said flotation discs have wall portions defining an aperture means therethrough in said upper portion of said flotation means to provide an airflow passage between adjacent liner compartments.

27. The arrangement defined in claim 26 wherein:

said liner means is coupled to said tubular member in regions adjacent said first and said second ends thereof; and said aperture means in said liner means is a substantially continuous aperture means between said first end and said second end of said tubular member and in regions adjacent said aperture means in said plurality of flotation discs.

28. The arrangement defined in claim 27 wherein said transversely rigid and longitudinally compressible-expandable means comprises a wire means extending substantially from said first end to said second end of said tubular member in a generally helical configuration.

29. The arrangement defined in claim 16 wherein said vent means further comprises:
a first tubular vent member in said liner cavity having walls defining a first passageway and having a first end and a second end, and said first end coupled to said walls of said flotation means in said upper portions thereof and said second end in said upper portion of said flotation means in said liner cavity providing communications through said first passageway from said liner cavity to regions external said flotation means; and
a second tubular vent member in said liner cavity having walls defining a second passageway and a first end of said second tubular vent member coupled to said walls of said flotation means in opposed relationship to said first end of said first tubular vent member and a second end thereof in said upper portion of said flotation means in said liner cavity providing communication between regions external said flotation means and said liner cavity.

30. The arrangement defined in claim 17 and further comprising:
fastener means for holding said flotation discs, said liner means and said tubular member in a predetermined relationship.

31. The arrangement defined in claim 16 wherein:
said liner means is bonded to said walls of said tubular member at predetermined locations.

32. The arrangement defined in claim 17 wherein:
said transversely rigid and longitudinally compressible-expandable means comprises:
a wire means extending from said first end to said second end of said tubular member in a generally helical configuration.

33. In an improved containment boom section, the improvement comprising, in combination:
flotation means having a predetermined buoyancy to provide upper portions thereof above the surface level of a liquid body for the condition of the boom section in the liquid body and a lower portion below the surface level;
said flotation means comprising:
an elongated, flexible, generally tubular outer covering member having walls defining an internal cavity and having a first end and a second end, and longitudinally compressible-expandable between a compressed, storage condition and an elongated, deployed condition and having a first degree of flexibility;
a flexible liner means in said cavity and adjacent inner surfaces of said walls of said tubular member, and said liner means having walls having inner surfaces defining a liner cavity substantially coextensive with said cavity of said tubular member, and said liner means having a second degree of flexibility;
a transversely rigid and longitudinally compressible-expandable means positioned intermediate said walls of said liner means and said walls of said tubular member for maintaining said tubular member in a predetermined transverse cross-sectional configuration in said storage and said deployed conditions;
connection means coupled to said tubular member for connecting said transversely rigid and longitudinally compressible-expandable means to said tubular member; and
vent means in said tubular member and said liner means in regions adjacent said upper portion of said flotation means to allow passage of air into and out of said cavity of said tubular member and said liner cavity.

34. The arrangement defined in claim 33 wherein:
a plurality of flotation discs in a predetermined spaced array having a predetermined longitudinal thickness and a predetermined buoyancy in said liner cavity and extending transversely thereacross to divide said liner cavity into a plurality of liner compartments, and said flotation discs having a specific gravity less than 1.0 and said liner means having first wall portions defining aperture means therethrough for providing airflow passageway means between said liner cavity and said cavity and said cavity of said tubular member; and
said connection means comprises a first connecting member coupled to said tubular member adjacent said first end thereof for connecting a first end of said transversely rigid and longitudinally compressible-expandable means thereto and a second connecting member coupled to said tubular member adjacent said second end thereof for connecting a second end of said transversely rigid and longitudinally compressible-expandable means thereto.

35. The arrangement defined in claim 34 wherein:
at least a portion of said plurality of flotation discs are bonded to said inner surface of said walls of said liner means.

36. The arrangement defined in claim 35 wherein:
said bonding of said flotation discs is substantially watertight and substantially continuous around the periphery thereof;
said vent means comprises wall portions in said walls of said tubular member and said liner means defining an aperture therethrough in regions adjacent said upper portion of said flotation means adjacent each of said liner compartments.

37. The arrangement defined in claim 36 wherein:
at least a portion of said flotation discs have wall portions defining an aperture means therethrough in said upper portion of said flotation means to provide an airflow passage between adjacent liner compartments.

38. The arrangement defined in claim 35 wherein:
a plurality of tension strap members positioned between said liner means and said tubular member and extending around each of said flotation discs to maintain said flotation discs in said predetermined spaced array.

39. The arrangement defined in claim 38 wherein:
at least a portion of said flotation discs have wall portions defining an aperture means therethrough in said upper portion of said flotation means to provide an airflow passage between adjacent liner compartments.

40. The arrangement defined in claim 33 wherein:
said transversely rigid and axially compressible-expandable means comprises a wire means extending substantially from said first end to said second end of said tubular member in a generally helical configuration.

41. The arrangement defined in claim 33 wherein:
said transversely rigid and longitudinally compressible-expandable means comprises a plurality of ring-like members in a spaced array between said first end and said second end of said tubular member.

42. The arrangement defined in claim 34 and further comprising:
fastener means for holding said flotation discs, said liner means and said tubular member in a predetermined relationship.

43. The arrangement defined in claim 33 wherein:
said liner means is bonded to said walls of said tubular member at predetermined locations.

44. The arrangement defined in claim 33 and further comprising:
a plurality of flotation discs in a predetermined spaced array having a predetermined longitudinal thickness and a predetermined buoyancy in said liner cavity and extending transversely thereacross to divide said liner cavity into a plurality of liner compartments, and said flotation discs having a specific gravity less than 1.0 and said liner means having first wall portions defining aperture means therethrough for providing airflow passageway means between said liner cavity and said cavity of said tubular member;
said predetermined buoyancy is selected to provide at least neutral buoyancy for the condition of each of said compartments substantially filled with the liquid.

45. The arrangement defined in claim 33 and further comprising:
a plurality of flotation discs in a predetermined spaced array having a predetermined longitudinal thickness and a predetermined buoyancy in said liner cavity and extending transversely thereacross to divide said liner cavity into a plurality of liner compartments, and said flotation discs having a specific gravity less than 1.0 and said liner means having first wall portions defining aperture means therethrough for providing airflow passageway means between said liner cavity and said cavity of said tubular member;
said predetermined buoyancy is selected to provide approximately 50% of the volume of said tubular member in said upper portion of said flotation means for the condition of said compartments substantially filled with said liquid.

46. In an improved containment boom section, the improvement comprising, in combination:
flotation means having a predetermined buoyancy to provide upper portions thereof above the surface level of a liquid body for the condition of the boom section in the liquid body and a lower portion below the surface level;
said flotation means comprising:
an elongated, flexible generally tubular member having walls defining an internal cavity and having a first end and a second end, and longitudinally compressible-expandable between a compressed, storage condition and an elongated, deployed condition and having a first degree of flexibility;
a transversely rigid and longitudinally compressible-expandable means positioned in said walls of said tubular member for maintaining a predetermined, transverse cross-sectional configuration of said tubular member in said compressed and said elongated conditions;
vent means in said tubular member in regions adjacent said upper portion of said flotation means to allow passage of air into and out of said cavity of said tubular member.

47. The arrangement defined in claim 46 and further comprising:
a plurality of barrier means in said cavity in a spaced apart relationship, and each of said barrier means extending transversely across said cavity for dividing said cavity into a plurality of compartments; and
said vent means comprises means for venting each of said compartments to regions external said flotation means.

48. The arrangement defined in claim 47 wherein:
said transversely rigid and longitudinally compressible-expandable means compresses a wire means extending from said first end to said second end of said tubular member in a generally helical configuration;
said barrier means has a predetermined buoyancy and comprises:
a plurality of flotation discs having a predetermined longitudinal thickness and having a specific gravity less than 1.0.

49. The arrangement defined in claim 48 wherein:
each of said plurality of flotation discs has said predetermined cross-sectional configuration of said tubular member and are bonded to said inner surface of said walls of said tubular member.

50. The arrangement defined in claim 47 wherein:
said transversely rigid and longitudinally compressible-expandable means comprises a plurality of ring-like members in a spaced array between said first end and said second end of said tubular member;
said barrier means has a predetermined buoyancy and comprises:
a plurality of flotation discs having a predetermined longitudinal thickness and having a specific gravity less than 1.0.

51. The arrangement defined in claim 33 wherein:
said transversely rigid and longitudinal compressible-expandable means comprises:
a plurality of flotation discs in a predetermined spaced array having a predetermined longitudinal thickness and a predetermined buoyancy in said liner cavity and extending transversely thereacross to divide said liner cavity into a plurality of liner compartments, and said flotation discs having a specific gravity less than 1.0 and said liner means having first wall portions defining aperture means therethrough for providing airflow passageway means between said liner cavity and said cavity of said tubular member.

52. In an improved containment boom section the improvement comprising, in combination:
flotation means having a predetermined buoyancy to provide upper portions thereof above the surface level of a liquid body for the condition of the boom section in the liquid body and a lower portion below the surface level;
said flotation means comprising:
an elongated, flexible, generally tubular outer covering member having walls defining an internal cavity and having a first end and a second end, and longitudinally compressible-expandable between a compressed, storage condition and an elongated, deployed condition and having a first degree of flexibility;

a flexible liner means in said cavity and adjacent inner surfaces of said walls of said tubular member, and said liner means having walls defining a liner cavity substantially coextensive with said cavity of said tubular member, and said liner means having a second degree of flexibility;

a transversely rigid and longitudinally compressible-expandable means positioned in said walls of said liner means for maintaining a predetermined transverse cross-sectional configuration of said tubular member in said compressed and said elongated condition;

vent means in said tubular member and said liner means in regions adjacent said upper portion of said flotation means to allow passage of air into and out of said cavity of said tubular member and said liner cavity.

53. The arrangement defined in claim 52 and further comprising:

a plurality of flotation discs in a predetermined spaced array having a predetermined longitudinal thickness and a predetermined buoyancy in said liner cavity and extending transversely thereacross to divide said liner cavity into a plurality of liner compartments, and said flotation discs having a specific gravity less than 1.0 and said liner means having first wall portions defining aperture means therethrough for providing airflow passageway means between said liner cavity and said cavity of said tubular member.

54. The arrangement defined in claim 53 wherein:
said transversely rigid and longitudinally compressible-expandable means comprises a wire means extending from said first end to said second end of said tubular member in a generally helical configuration.

55. The arrangement defined in claim 52 wherein:
said transversely rigid and longitudinally compressible-expandable means comprises a plurality of ring-like members in a spaced array between said first end and said second end of said tubular member.

56. The arrangement defined in claim 52 wherein:
said transversely rigid and longitudinally compressible-expandable means comprises:
a wire means extending from said first end to said second end of said tubular member in a generally helical configuration.

57. In an improved containment boom section, the improvement comprising, in combination:

flotation means having a predetermined buoyancy to provide upper portions thereof above the surface level of a liquid body for the condition of the boom section in the liquid body, and a lower portion below the surface level;

said flotation means comprising:
an elongated, flexible, generally tubular member having walls having internal surfaces defining an internal cavity and having a first end and a second end, and longitudinally compressible-expandable between a compressed, storage condition and an elongated, deployed condition;

a transversely rigid and longitudinally compressible-expandable means in said cavity extending substantially from said first end to said second end of said tubular member and bearing against said internal surfaces of said walls of said tubular member for maintaining a predetermined transverse cross-sectional configuration of said tubular member in said compressed and said elongated condition;

connection means coupled to said tubular member for connecting said transversely rigid and longitudinally compressible-expandable means to said tubular member;

vent means in said tubular member in regions adjacent said upper portion of said flotation means for providing an air passageway between said cavity and regions external said flotation means, and said transversely rigid and longitudinally compressible-expandable means comprises:

a plurality of flotation discs in a predetermined spaced array having a predetermined longitudinal thickness and a predetermined buoyancy in said cavity and extending transversely thereacross to divide said cavity into a plurality of compartments, and said flotation discs having a specific gravity less than 1.0 and said tubular member having first wall portions defining aperture means therethrough for providing airflow passageway means between said cavity of said tubular member and regions external said flotation means.

58. In an improved containment boom section, the improvement comprising, in combination:

flotation means having a predetermined buoyancy to provide upper portions thereof above the surface level of a liquid body for the condition of the boom section in the liquid body, and a lower portion below the surface level;

said flotation means comprising:
an elongated, flexible, generally tubular member having walls having internal surfaces defining an internal cavity and having a first end and a second end, and longitudinally compressible-expandable between a compressed, storage condition and an elongated, deployed condition, and said walls of said tubular member bonded together at a plurality of spaced apart locations intermediate said first end and said second end to divide said cavity into a plurality of compartments;

a transversely rigid and longitudinally compressible-expandable means in each of said compartments and extending between said bonded together locations of said tubular member and bearing against said internal surfaces of said walls of said tubular member for maintaining a predetermined transverse cross-sectional configuration of said compartments of said cavity of said tubular member in said compressed and said elongated condition;

connection means coupled to said tubular member for connecting said transversely rigid and longitudinally compressible-expandable means to said tubular member; and vent means in said tubular member in regions adjacent said upper portion of said flotation means for providing an air passageway between said compartments of said cavity and regions external said flotation means.

59. The arrangement defined in claim 58 and further comprising:
a plurality of flotation discs in a predetermined spaced array having a predetermined longitudinal thickness and a predetermined buoyancy in said compartments of said cavity and extending transversely thereacross to divide said compartments into a plurality of sections, and said flotation discs having a specific gravity less than 1.0 and said tubular member having first wall portions defining aperture and tubular member means therethrough for providing airflow passageway means between said compartments and said sections of said tubular member and regions external said flotation means.

60. The arrangement defined in claim 59 wherein:
said transversely rigid and longitudinally compressible-expandable means comprises a wire means extending from said first end to said second end of said tubular member in a generally helical configuration.

61. In an improved containment boom section, the improvement comprising, in combination:
flotation means having a predetermined buoyancy to provide upper portions thereof above the surface level of a liquid body for the condition of the boom section in the liquid body, and a lower portion below the surface level;
said flotation means comprising:
an elongated, flexible, generally tubular member having walls having internal surfaces defining an internal cavity and having a first end and a second end, and longitudinally compressible-expandable between a compressed, storage condition and an elongated, deployed condition;
a transversely rigid and longitudinally compressible-expandable means substantially free of longitudinal resilient forces in said cavity for maintaining a predetermined transverse cross-sectional configuration of said tubular member in said compressed and said elongated condition; and
vent means in said tubular member for providing an air passageway between said cavity and regions external said flotation means.

62. The arrangement defined in claim 61 wherein:
said vent means comprises a buoyancy section, and said buoyancy section comprising:
a buoyancy member in said cavity of said tubular member having a predetermined longitudinal length and a preselected specific gravity less than 1.0, and said buoyancy member having:
a base portion in said lower portion of said flotation means and extending at least partially into said upper portion of said flotation means;
a longitudinal extending divider portion coupled to said base portion and extending in said upper portion of said cavity of said tubular member a predetermined distance above said base portion to divide said cavity in said upper portion of said flotation means in regions adjacent said buoyancy member into two longitudinally extending chambers, each of said chambers communicating with said cavity;
said tubular member having vent walls defining a vent aperture means therethrough for providing an airflow passageway between said two longitudinal chambers and regions external said flotation means and above the surface level of the liquid body; and
said tubular member having drainhole walls defining drain apertures therethrough for providing the liquid flow passageway from said longitudinal chambers to regions external said flotation means.

63. The arrangement defined in claim 62 wherein:
said vent means is intermediate said first end and said second end of said flotation means.

64. The arrangement defined in claim 62 wherein:
said vent means is adjacent at least a first end of said flotation means.

65. The arrangement defined in claim 64 wherein:
said tubular member and said buoyancy member are longitudinally tapered at said first end of said flotation means and adjacent at least said first end of said tubular member.

66. The arrangement defined in claim 65 wherein:
said tubular member is rigid walled in regions adjacent said first end.

67. The arrangement defined in claim 66 and further comprising:
interconnection means for connecting said vent means to said tubular member.

68. The arrangement defined in claim 65 wherein:
said tubular member having drawstring walls therethrough in said upper portions of said flotation means in regions adjacent one of said first and said second ends thereof;
and further comprising:
a flexible drawstring means having a first end extending from regions external said flotation means through said drawstring aperture, and said drawstring means extending through at least one of said longitudinal chambers and through said cavity of said tubular member, and having a second end coupled to said tubular member at a predetermined location.

69. The arrangement defined in claim 67 wherein:
said interconnection means further comprises:
a first rigid walled hollow generally cylindrical section flotation disc in said tubular member;
a second rigid walled hollow cylindrical flotation disc in said vent means; and
interlocking means mounted on said first and said second flotation discs to provide a detachable coupling therebetween.

70. The arrangement defined in claim 1 wherein:
said tubular member having drawstring walls therethrough in said upper portions of said flotation means in regions adjacent one of said first and said second ends thereof;
and further comprising:
a flexible drawstring means having a first end extending from regions external said flotation means through said drawstring aperture, and said drawstring means extending through at least one of said longitudinal chambers and through said cavity of said tubular member, and having a second end coupled to said tubular member at the other of said first and said second end thereof.

71. The arrangement defined in claim 9 wherein said flotation discs further comprise:
a rigid walled generally hollow section.

72. The arrangement defined in claim 16 wherein:

said tubular member and said liner means each having drawstring walls therein defining a drawstring aperture therethrough in said upper portions of said flotation means in regions adjacent one of said first and said second ends thereof; and
further comprising:
a flexible drawstring means having a first end extending from regions external said flotation means through said drawstring apertures, and said drawstring means extending through at least one of said longitudinal chambers and through said liner cavity of said liner means, and having a second end coupled to said tubular member at a predetermined location.

73. The arrangement defined in claim 17 wherein said flotation discs further comprise:
a rigid walled generally hollow section.

74. The arrangement defined in claim 46 wherein:
said tubular member having drawstring walls therethrough in said upper portions of said flotation means in regions adjacent one of said first and said second ends thereof;
and further comprising:
a flexible drawstring means having a first end extending from regions external said flotation means through said drawstring aperture, and said drawstring means extending through at least one of said longitudinal chambers and through said cavity of said tubular member, and having a second end coupled to said tubular member at a predetermined location.

75. The arrangement defined in claim 47 wherein said barrier means has a predetermined buoyancy and comprises:
a plurality of flotation discs having a predetermined longitudinal thickness and having a specific gravity less than 1.0, and at least a first portion of said flotation discs comprising a rigid walled hollow member.

76. In an improved containment boom section, the improvement comprising, in combination:
flotation means having a predetermined buoyancy to provide upper portions thereof above the surface level of a liquid body for the condition of the boom section in the liquid body, and a lower portion below the surface level;
said flotation means comprising:
an elongated, flexible, generally tubular member having walls having internal surfaces defining an internal cavity and having a first end and a second end, and longitudinally compressible-expandable between a compressed, storage condition and an elongated, deployed condition, and said walls of said tubular member bonded together at a plurality of spaced apart locations intermediate said first end and said second end to divide said cavity into a plurality of compartments;
a transversely rigid and longitudinally compressible-expandable means in each of said compartments and extending between said bonded together locations of said tubular member and bearing against said internal surfaces of said walls of said tubular member for maintaining a predetermined transverse cross-sectional configuration of said compartments of said cavity of said tubular member in said compressed and said elongated condition;
connection means coupled to said tubular member for connecting said transversely rigid and longitudinally compressible-expandable means to said tubular member; and
vent means in said tubular member for providing an air passageway between said compartments of said cavity and regions external said flotation means, said vent means comprising the buoyance section comprising:
a buoyancy member in said cavity of said tubular member having a predetermined longitudinal length and a preselected specific gravity less than 1.0, and said buoyancy member having:
a base portion in said lower portion of said flotation means and extending at least partially into said upper portion of said flotation means;
a longitudinal extending divider portion coupled to said base portion and extending in said upper portion of said cavity of said tubular member a predetermined distance above said base portion to divide said cavity in said upper portion of said flotation means in regions adjacent said buoyancy member into two longitudinally extending chambers, each of said chambers communicating with said cavity;
said tubular member having vent walls defining a vent aperture means therethrough for providing an airflow passageway between said two longitudinal chambers and regions external said flotation means and above the surface level of the liquid body; and
said tubular member having drainhole walls defining drain apertures therethrough for providing the liquid flow passageway from said longitudinal chambers to regions external said flotation means.

77. The arrangement defined in claim 53 wherein:
said flotation discs have wall portions defining apertures therethrough in said upper portions of said flotation means to provide an air flow passage between adjacent liner compartments.

78. The arrangement defined in claim 52 and further comprising:
connection means for connecting said liner means to said tubular member.

* * * * *